US012709122B2

(12) United States Patent
Carnahan

(10) Patent No.: US 12,709,122 B2
(45) Date of Patent: Aug. 18, 2026

(54) WIRELESS MONITORING SYSTEM FOR TUBELESS TIRES

(71) Applicant: Jason Carnahan, Meridian, ID (US)

(72) Inventor: Jason Carnahan, Meridian, ID (US)

(73) Assignee: JASON CARNAHAN, Meridian, ID (US)

(*) Notice: Subject to any disclaimer, the term of this patent is extended or adjusted under 35 U.S.C. 154(b) by 0 days.

(21) Appl. No.: 18/969,179

(22) Filed: Dec. 4, 2024

(65) Prior Publication Data

US 2025/0222725 A1 Jul. 10, 2025

Related U.S. Application Data

(60) Provisional application No. 63/617,983, filed on Jan. 5, 2024.

(51) Int. Cl.
*B60C 23/04* (2006.01)

(52) U.S. Cl.
CPC ...... *B60C 23/0427* (2013.01); *B60C 23/0413* (2013.01); *B60C 23/0454* (2013.01); *B60C 23/0479* (2013.01); *B60C 23/0486* (2013.01)

(58) Field of Classification Search
CPC ............ B60C 23/0427; B60C 23/0413; B60C 23/0454; B60C 23/0479; B60C 23/0486; B60C 23/006
See application file for complete search history.

(56) References Cited

U.S. PATENT DOCUMENTS 7,571,646 B1 8/2009 Houghton
9,645,031 B2 5/2017 Kanenari
9,987,888 B2 6/2018 Li et al.
11,400,667 B2 8/2022 Hong
11,485,179 B2 11/2022 Agarwal et al.
2005/0179531 A1 8/2005 Tabe
2013/0309964 A1* 11/2013 Hall ........................ H04B 5/24 455/41.1
2013/0319085 A1* 12/2013 Schwab .................. B60C 23/04 73/49
2014/0208121 A1* 7/2014 Arunan .................... H04B 5/20 713/176

(Continued)

OTHER PUBLICATIONS

"Non-Final Office Action U.S. Appl. No. 17/190,425, Non-Final Office Action mailed Mar. 2, 2023", (Mar. 3, 2021), 15 pgs.

(Continued)

*Primary Examiner* — Omeed Alizada

(74) *Attorney, Agent, or Firm* — SCHWEGMAN LUNDBERG & WOESSNER, P.A.

(57) ABSTRACT

A wireless sealant and pressure monitoring system for tubeless tires includes an integrated wireless component positioned inside a tubeless tire. The integrated wireless component comprises a first and second conductive sealant sensor pad, a current sensor, and a pressure sensor. The current sensor measures an electrical current flowing between the first and second sealant sensor pads, providing a measure of the sealant level inside the tire. The pressure sensor measures the pressure inside the tubeless tire. The system also includes a wireless transmitter in communication with the current sensor and pressure sensor, configured to transmit data corresponding to the measured electrical current and measured pressure.

16 Claims, 11 Drawing Sheets

(56) References Cited

U.S. PATENT DOCUMENTS

| | | | | |
|---|---|---|---|---|
| 2017/0064467 | A1* | 3/2017 | Fischer | H01Q 1/273 |
| 2018/0034507 | A1* | 2/2018 | Wobak | H04B 5/79 |
| 2018/0111345 | A1 | 4/2018 | Barnett | |
| 2018/0178601 | A1* | 6/2018 | Surendra | G07C 5/0816 |
| 2019/0001761 | A1* | 1/2019 | Agarwal | B60C 19/08 |
| 2020/0047566 | A1 | 2/2020 | Kim et al. | |
| 2022/0283011 | A1* | 9/2022 | Haronian | G01F 23/24 |

OTHER PUBLICATIONS

Boada, Marti, et al., "Battery-Less NFC Bicycle Tire Pressure Sensor Based on a Force-Sensing Resistor", IEEE Access, vol. 9, 2021, (Jul. 30, 2021), 13 pgs.

Continental, "ContiPressureCheck, The tire pressure monitoring system 6F72K", <http://www.contipressurecheck.com>, (Sep. 2015), 2 pgs.

Infineon, "KP226E3408 Analog Absolute Pressure Sensor", Infineon Technologies AG, 2021., <http://www.infineon.com/sensors>, (Jul. 7, 2021), 20 pgs.

Infineon, "KP229E3518 Analog Absolute Pressure Sensor", Infineon Technologies AG, 2010., <http://www.infineon.com/>, (Sep. 27, 2010), 26 pgs.

Infineon, "KP229F3519 Analog Absolute Pressure Sensor", Infineon Technologies AG, 2014, Rev. 2018., (Apr. 26, 2018), 23 pgs.

Infineon, "SP40PLUS Tire Pressure Monitoring Sensor", Infineon Technologies AG, 2020., <http://www.infineon.com>, (May 14, 2020), 72 pgs.

Lourens, Ruan, et al., "Tire Pressure Monitoring TPM System", Microchip Technology Inc., 2004., (2004), 12 pgs.

Melexis, "Melexis Enabled World's First TPMS Integrated by OEMs With Bluetooth Technology", Melexis Inspired Engineering, <http://www.melexis.com/TMS>, 1 pg.

Melexis, "MLX90328 Automotive Sensor Interface", Melexis Inspired Engineering, 2017., <http://www.melexis.com/>, (Dec. 22, 2017), 16 pgs.

Melexis, "MLX90815 Discrete Absolute Pressure Sensor", Melexis Inspired Engineering, 2016., <http://www.melexis.com/>, (Dec. 27, 2016), 6 pgs.

Melexis, "MLX90817 Absolute Pressure Sensor IC", Melexis Inspired Engineering, 2020., <http://www.melexis.com/>, (Oct. 20, 2020), 26 pgs.

Melexis, "MLX90818 Absolute Pressure Sensor", Melexis Inspired Engineering, 2019., <http://www.melexis.com>, (Feb. 25, 2019), 38 pgs.

NXP Semiconductors, "FXPS7550A4 Analog absolute pressure sensor, 20 to 550 kPa", NXP B.V., 2019., <http://www.nxp.com>, (May 29, 2019), 23 pgs.

NXP Semiconductors, "FXPS7550D4 Digital absolute pressure sensor, 20 kPa to 550 kPa", NXP B.V., 2020., <http://www.nxp.com>, (Aug. 28, 2020), 73 pgs.

NXP Semiconductors, "NHS3100 NTAG SmartSensor temperature monitor", NXP B.V., 2021., <http://www.nxp.com>, (May 27, 2021), 46 pgs.

NXP Semiconductors, "NHS3152 Therapy adherence resistive monitor", NXP B.V., 2021., <http://www.nxp.com>, (May 27, 2021), 48 pgs.

NXP Semiconductors, "NTAG SmartSensor-Easily create NFC sensing and logging applications", NXP B.V., 2017., <http://nxp.com/NTAGSmartSensor>, (2017), 2 pgs.

NXP Semiconductors, "UM10876 NHS31xx", NXP B.V., 2021., <http://www.nxp.com>, (Sep. 13, 2021), 240 pgs.

NXP Semiconductors, "UM11227 NTM88 family of tire pressure monitor sensors", NXP, B.V., 2020., <http://www.nxp.com>, (Apr. 24, 2020), 205 pgs.

Silicon Microstructures, "SM6841 Ultra Small Pressure Sensor", Silicon Microstructures, Inc., 2017., <http://www.si-micro.com>, (2017), 5 pgs.

STMicroelectronics, "Dual full-scale, 1260 hPa and 4060 hPa, absolute digital output barometer with embedded Qvar electrostatic sensor", STMicroelectronics, 2022., (May 4, 2022), 58 pgs.

STMicroelectronics, "Dual full-scale, 1260 hPa and 4060 hPa, absolute digital output barometer with water-resistant package", STMicroelectronics, 2021., (Dec. 2021), 51 pgs.

STMicroelectronics, "Pressure sensor kit with Qvar functionality based on ILPS22QS", STMicroelectronics, 2022., <http://www.st.com>, (Mar. 2022), 6 pgs.

* cited by examiner

WIRELESS MONITORING SYSTEM FOR TUBELESS TIRES

BACKGROUND

Tubeless tires, a prevalent type of tire, are widely utilized across a range of vehicles, encompassing bicycles, motorcycles, and automobiles. In contrast to traditional tires that employ an inner tube to sustain air pressure, tubeless tires operate on a different principle. They depend on the seal formed between the tire and the wheel's rim to confine the air. This innovative design confers several benefits to the user.

One of the primary advantages is the ability to operate at lower pressures. This feature is particularly beneficial for off-road and performance vehicles, where lower tire pressures can provide better traction and control. Lower pressures also allow the tire to absorb more shock from bumps and uneven surfaces, leading to a smoother and more comfortable ride.

Another notable advantage of tubeless tires is the enhanced ride quality. By eliminating the inner tube, tubeless tires can reduce the weight and rolling resistance, leading to improved fuel efficiency and handling. The absence of an inner tube also means that there is no friction and heat build-up between the tube and the tire, which can further enhance the ride comfort and longevity of the tire.

Furthermore, tubeless tires offer increased resistance to punctures, a common issue faced by all types of vehicles. The sealant used in tubeless tires can quickly seal small punctures, preventing the loss of air and maintaining the tire's performance. This self-sealing ability not only improves the reliability and safety of the tire but also reduces the downtime and cost associated with tire repair and replacement.

One of the main features of tubeless tires is the use of a sealant, a liquid substance that is added inside the tire. The sealant plays a pivotal role in the performance and safety of tubeless tires. It helps to maintain the seal between the tire and the rim, and can also rapidly seal small punctures that occur while the tire is in use, preventing or reducing air loss.

Monitoring the pressure inside a tire is a well-established practice that is integral to the safe and efficient operation of vehicles. Various systems and devices have been developed for this purpose, ranging from simple manual gauges to sophisticated wireless tire pressure monitoring systems (TPMS). These systems typically use sensors to measure the air pressure inside the tire and transmit this information to a display or alert system.

However, monitoring the level of sealant inside a tubeless tire presents a different set of challenges. The sealant is a liquid that is free to move around inside the tire, and its level can change over time due to factors such as evaporation, leakage, or consumption in the sealing of punctures. Furthermore, the sealant can interfere with the operation of pressure sensors if not properly accounted for.

Monitoring the level of sealant inside a tubeless tire is a complex task that presents a distinct set of challenges. Unlike air pressure, which is relatively stable and can be measured directly, the sealant is a liquid substance that is free to move around inside the tire. This mobility of the sealant makes it difficult to measure its level accurately and consistently.

Moreover, the level of sealant inside a tubeless tire can change over time due to a variety of factors. For instance, some of the sealant may evaporate over time, particularly in hot weather conditions. Leakage can also occur, either through small punctures in the tire or through the seal between the tire and the rim. Additionally, the sealant is consumed in the process of sealing punctures that occur while the tire is in use. All these factors can lead to a decrease in the sealant level over time, which can compromise the performance and safety of the tire if not properly monitored and addressed.

Another challenge in monitoring the sealant level in tubeless tires is the potential interference with the operation of pressure sensors. These sensors are typically designed to measure air pressure and may not function correctly in the presence of a liquid substance like the sealant. If the sealant comes into contact with the pressure sensor, it can cause inaccurate readings or even damage the sensor. Therefore, any system designed to monitor the sealant level in tubeless tires has to take into account the potential for interference with the pressure sensors and implement measures to prevent or mitigate this issue.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Overview

The present disclosure describes a wireless sealant and pressure monitoring system for tubeless tires. The system includes an integrated wireless component, which is strategically positioned inside a tubeless tire. This integrated wireless component comprises several integral parts that work in unison to monitor the sealant level and tire pressure.

The first and second conductive sealant sensor pads are part of the integrated wireless component. These sensor pads are exposed to the interior of the tubeless tire and are designed to detect the presence and amount of sealant within the tire. The sensor pads are made of a conductive material that can detect the presence of sealant based on its ability to conduct electrical current. The sensor pads are positioned in close proximity to each other, typically approximately ¼ inch apart, to facilitate accurate measurement of the sealant level.

The current sensor is electrically connected to the first and second conductive sealant sensor pads. The current sensor is configured to measure an electrical current flowing between the first and second sealant sensor pads. This current measurement provides a direct indication of the sealant level inside the tubeless tire. The higher the current flow between the sensor pads, the higher the sealant level, and vice versa.

The pressure sensor is another part of the integrated wireless component. The pressure sensor is designed to measure the pressure inside the tubeless tire. In some cases, the pressure sensor may be a piezoresistive pressure sensor, which measures pressure based on the change in electrical resistance that occurs when mechanical strain is applied to the sensor. The pressure sensor can measure pressures in a range of 5 to 60 PSI, making it suitable for monitoring the pressure levels in tubeless bicycle tires, which typically operate at lower pressures compared to automotive tires.

The wireless transmitter is in communication with both the current sensor and the pressure sensor. The wireless transmitter is configured to transmit data corresponding to the measured electrical current and measured pressure. This data transmission allows the sealant level and tire pressure information to be wirelessly communicated to an external device, such as a mobile phone, for real-time monitoring and display.

Wireless Sensor Module

Figure 1:
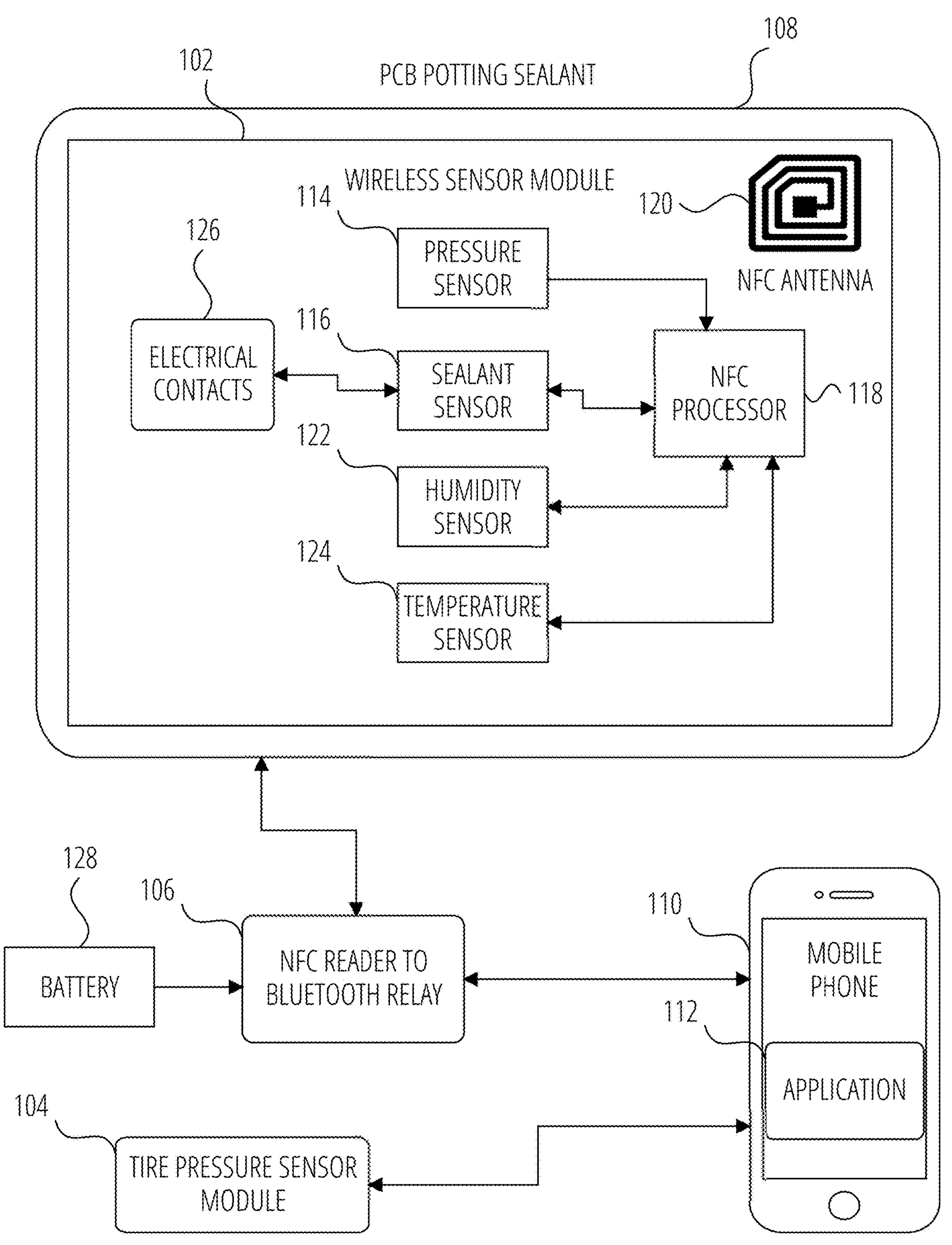
FIG. 1 is an orthogonal view illustrating a wireless tire pressure and sealant monitoring system, featuring a wireless sensor module encapsulated by printed circuit board (PCB) potting sealant, which houses various sensors interconnected with a near field communication (NFC) processor, according to some examples.

Referring to FIG. 1, the wireless sensor module 102, according to some examples, which includes a printed circuit board (PCB) of a predetermined shape designed to fit within the contours of a tubeless tire, is partially encapsulated by a PCB potting sealant 108. The PCB is composed of a durable material capable of withstanding the flexing and vibrations experienced within the tire environment.

This encapsulation with PCB potting sealant 108 protects the wireless sensor module 102 from moisture ingress and corrosion, conditions that are prevalent inside a tubeless tire due to exposure to the elements and the tire's operational stresses. The PCB potting sealant 108, selected for its robust adhesion properties and compatibility with the PCB materials, covers the wireless sensor module 102 thoroughly, except detection components for of a pressure sensor 114, sealant sensor 116, a humidity sensor 122, and a temperature sensor 124. For example, the two or more electrical contacts 126 of the sealant sensor 116 are not covered by the PCB potting sealant 108. The electrical contacts 126, crafted from a conductive material resistant to oxidative degradation, are deliberately left unencapsulated and exposed to the interior of the tubeless tire. This strategic exposure is to ensure that the electrical contacts 126 can directly interact with the sealant to enable accurate detection of the sealant level, which is a parameter for the tire's performance and safety.

The wireless sensor module 102 comprises several integral components that work in unison to monitor the tire pressure and sealant level. These components include a pressure sensor 114, a sealant sensor 116, a humidity sensor 122, and a temperature sensor 124. All these sensors are mounted on the PCB and interconnected through carefully routed conductive traces that provide electrical connectivity. The NFC processor 118, which serves as the central hub for data processing, is also mounted on the PCB and electrically connected to each sensor. It processes the sensor data, converting it from analog to digital signals as appropriate, and prepares it for wireless transmission. The layout of the PCB is designed to optimize the space and ensure that the sensors are positioned to accurately detect their respective parameters without interference. The components are soldered onto the PCB using materials and techniques that enhance their durability and resistance to the tire's operational environment.

The NFC processor 118, a central component of the wireless sensor module, is connected to an NFC antenna 120. This connection is integral to the operation of the system as it enables wireless communication between the sensor module and an external reader device. The NFC antenna 120 serves as the conduit for this communication, receiving and transmitting signals to and from the NFC processor 118.

The NFC antenna 120 is designed to operate at a specific frequency that allows for efficient and reliable data transmission. It captures the data signals from the NFC processor 118, which contains the processed sensor data, and transmits these signals wirelessly to the external reader device. This wireless transmission of data enables real-time monitoring of the tire pressure and sealant levels, providing the user with up-to-date information about the conditions inside the tubeless tire.

Furthermore, the NFC antenna 120 also plays a role in powering the wireless sensor module. During an NFC transaction, a small amount of energy is transferred from the external reader device to the NFC antenna 120. This energy is then harvested by the NFC processor 118 and used to power the sensor module, eliminating the dependency on an internal power source. This self-powered operation enhances the reliability and longevity of the sensor module, ensuring its continuous operation even in the challenging environment of a tubeless tire.

In some examples, the NFC antenna 120 may be designed to operate at a different frequency that still allows for efficient and reliable data transmission. This may include frequencies within the range of 13.56 MHz to 14.56 MHz, which are commonly used for NFC communication. This variation may provide flexibility in the design of the wireless sensor module and allow it to adapt to different NFC standards or regulations.

In some examples, the NFC antenna 120 may be designed with a different shape or size to optimize its performance. For example, the antenna may be designed with a larger surface area to capture more energy from the NFC transaction, enhancing the power supply to the sensor module.

Alternatively, the antenna may be designed with a more compact size to fit within smaller or narrower tubeless tires.

In some examples, the NFC antenna 120 may be replaced with a different type of wireless antenna, such as a Bluetooth or Wi-Fi antenna. This may allow the wireless sensor module to communicate with a wider range of external reader devices, enhancing the versatility of the system. However, this variation would require a different method of powering the sensor module, as Bluetooth and Wi-Fi antennas do not provide energy harvesting capabilities like NFC antennas.

In some examples, the energy harvested by the NFC processor 118 may be stored in a small energy storage device, such as a capacitor or a rechargeable battery, before being used to power the sensor module. This may provide a more stable power supply to the sensor module and allow it to operate even when the NFC transaction is not taking place. This variation may enhance the reliability and longevity of the sensor module, ensuring its continuous operation even in the challenging environment of a tubeless tire.

In some examples, the NFC processor 118 may be designed with a power management feature that regulates the use of the harvested energy. This feature may prioritize the power supply to the pressure sensor and the current sensor, ensuring that these sensors can operate effectively even when the harvested energy is low. This variation may enhance the accuracy and reliability of the pressure and sealant level measurements, improving the overall performance of the system.

The pressure sensor 114 is designed to measure the pressure inside the tubeless tire. In some cases, the pressure sensor 114 may comprise an STMicroelectronics ILPS22QS chip, which is a compact pressure sensor capable of sensing pressures up to 60 PSI. This range is suitable for monitoring the pressure levels in tubeless bicycle tires, which typically operate at lower pressures compared to automotive tires.

The sealant sensor 116 is specifically engineered to detect the level of sealant within the tubeless tire. The sensor operates on the principle of electrical conductivity, a property that varies with the presence and amount of sealant in the tire. The sealant sensor 116 is designed with two or more electrical contacts 126, which serve as the points between which conductivity is measured.

As the level of sealant in the tire increases, the sealant, being a conductive liquid, allows for a greater flow of electrical current between the electrical contacts 126. This results in an increase in the conductivity between the contacts. Conversely, when the level of sealant decreases, less sealant is present between the contacts to facilitate the flow of electrical current. This leads to a decrease in conductivity between the electrical contacts 126.

This change in conductivity, whether an increase or decrease, provides a direct and reliable indication of the sealant level inside the tubeless tire. By continuously monitoring the conductivity between the electrical contacts 126, the sealant sensor 116 can provide real-time data on the sealant level within the tire. This data is invaluable for maintaining the performance and safety of the tire, as it allows the user to ensure that the sealant level is adequate and replenish it if it falls below the recommended level.

In some examples, the sealant sensor 116 may be designed with three or more electrical contacts to measure conductivity. This may provide a more detailed and accurate measure of the sealant level, as it allows for multiple conductivity readings at different points within the tire. The additional contacts may be arranged in a linear or radial pattern, or any other configuration that allows for effective measurement of the sealant level.

In some examples, the sealant sensor 116 may be designed to measure the resistance between the electrical contacts, instead of the conductivity. Resistance is the inverse of conductivity, and measuring resistance may provide an alternative method for detecting the sealant level. As the level of sealant increases, the resistance between the contacts decreases, and vice versa. This resistance measurement may provide a direct and reliable indication of the sealant level inside the tubeless tire.

In some examples, the sealant sensor 116 may be designed to measure the capacitance between the electrical contacts. Capacitance is a property that varies with the presence and amount of a dielectric material, such as the sealant, between the contacts. As the level of sealant increases, the capacitance between the contacts increases, and vice versa. This capacitance measurement may provide another method for detecting the sealant level.

The humidity sensor 122 is designed to measure the humidity level inside the tubeless tire. The presence of sealant inside the tire increases the humidity level, and by detecting this humidity level, the humidity sensor 122 can indirectly measure the sealant level.

In some examples, the humidity sensor 122 may be replaced or supplemented with a different type of sensor that can indirectly measure the sealant level. For example, a temperature sensor may be used, as the presence of sealant inside the tire can affect the temperature within the tire. By detecting the temperature inside the tire, the temperature sensor can indirectly measure the sealant level.

The temperature sensor 124 may be designed to measure the temperature inside the tubeless tire. This temperature data can provide additional information about the tire's operating conditions, which can be useful for diagnosing potential issues or optimizing the tire's performance.

The NFC processor 118 may be a small single-chip solution that allows for NFC power, has an i2c interface for communication with other chips, and has an analog-to-digital converter and current sensor to gather pressure and/or sealant information. The NFC processor 118 is connected to an NFC antenna 120, which can be integrated onto a printed circuit board of the wireless sensor module 102 or can be a flexible standard antenna connected to a small NFC sensor PCB. The NFC antenna 120 is responsible for receiving NFC signals and powering the module during an NFC transaction.

The wireless sensor module 102 is configured to relay tire pressure data, sealant level data, and temperature data to a wireless reader device using an NFC data exchange format. This wireless transmission of data allows the tire pressure and sealant level information to be accessed in real-time, providing a convenient and efficient method for monitoring and maintaining the performance and safety of tubeless tires.

Figure 2:
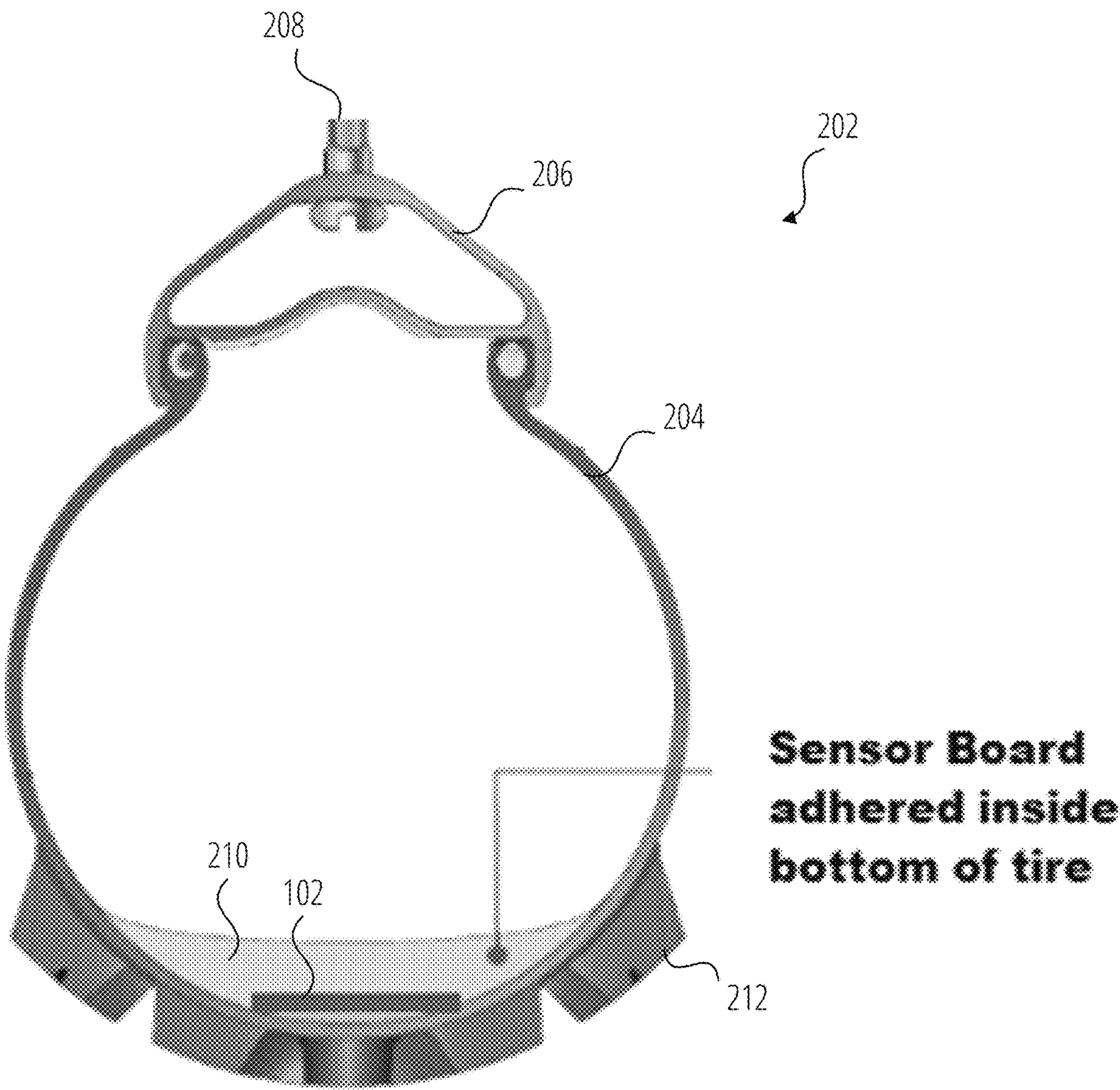
FIG. 2 is a cross-sectional view illustrating a tubeless tire assembly with a tire pressure sensor module integrated within the tire mounted on a rim, according to some examples.

FIG. 2—Tubeless Tire 204

Referring to FIG. 2, a cross-sectional view of a tubeless tire assembly, according to some examples, is depicted, where a tire pressure sensor module 104 is integrated within the tire 204. The tire 204 is mounted on a rim 206, and a spoke rim 206 connects the rim 206 to the hub at the center. Sealant 210 is applied along the interior surface of the tire 204, partially surrounding the wireless sensor module 102. The exterior of the tire features a tire tread 212, which provides the contact surface for the vehicle's movement.

The wireless sensor module 102 is strategically positioned and adhered to the bottom of the tire's interior to effectively monitor pressure within the enclosed space formed by the tire 204 and rim 206. The wireless sensor module 102 is designed to be in direct contact with the sealant 210, allowing it to accurately measure the sealant level inside the tire. The wireless sensor module 102 is also in close proximity to the interior surface of the tire 204, enabling it to accurately measure the tire pressure.

In some cases, the wireless sensor module 102 may be adhered to an inside surface of the tubeless tire 204 at a location marked on the outside surface of the tubeless tire 204. This marking can provide a visual guide for the placement of the wireless sensor module 102, ensuring that it is positioned in the correct location for accurate measurement of the sealant level and tire pressure.

In some cases, the wireless sensor module 102 can be adhered to an inside surface of the tubeless tire 204 at a location corresponding to an existing marking on the outside surface of the tubeless tire 204. This existing marking can be a manufacturer's logo, a specification label, or any other marking that is already present on the outside surface of the tire 204. Using an existing marking for the placement of the wireless sensor module 102 can simplify the installation process and ensure that the wireless sensor module 102 is positioned in the correct location for accurate measurement of the sealant level and tire pressure.

In some examples, the wireless sensor module 102 may include multiple sealant sensors positioned at different locations within the tire. This may provide a more comprehensive measure of the sealant distribution within the tire, as it allows for sealant level measurements at multiple points. The data from these multiple sensors may be combined to provide a detailed map of the sealant distribution within the tire.

In some examples, the wireless sensor module 102 may be designed to measure the viscosity of the sealant 210 in addition to its level. The viscosity of the sealant can affect its ability to seal punctures and its distribution within the tire. By measuring the viscosity, the system can provide additional information about the condition and performance of the sealant.

In some examples, the wireless sensor module 102 may be designed to measure the pH of the sealant. The pH of the sealant can affect its performance and longevity, and by measuring the pH, the system can provide additional information about the condition of the sealant.

While the wireless sensor module 102 is described above as being adhered to the inside surface of the 204, it can be integrated into tubeless tires through multiple manufacturing and installation methods:

Adhesive Installation: As noted above, the wireless sensor module 102 can be adhered to an inside surface of the tubeless tire using a specialized adhesive coating. This installation method allows for precise positioning of the sensor module, typically at a location corresponding to an existing marking on the outside surface of the tubeless tire for easy reference. The adhesive is compatible with both the tire material and the PCB potting sealant that encapsulates the sensor module.

Integrated Mesh Pocket: During the tire manufacturing process, in some examples, a reinforced mesh pocket structure can be incorporated into the inner liner of the tire. This mesh pocket may be positioned at an accessible monitoring location within the tire, for example, at the bottom portion of the tire's interior. The mesh pocket may be constructed from a flexible, high-strength material compatible with the tire's rubber compound and designed to securely hold the wireless sensor module while allowing it to maintain contact with the tire sealant. The pocket may include

- A flexible mesh retention structure that allows sealant flow while securing the sensor
- Reinforced pocket walls integrated with the tire's inner liner
- A secure closure mechanism for aftermarket sensor installation
- Drainage channels to prevent sealant pooling around the sensor Molded Integration: For permanent integration, in some examples, the wireless sensor module 102 can be directly molded into the tire during the manufacturing process. This method may involve:

- Positioning the wireless sensor module 102 within the tire mold before the final cure
- Encapsulating the sensor in a protective housing designed to withstand the vulcanization process
- Incorporating specialized heat-resistant material to protect the sensor's electronic components during the high-temperature curing process
- Including dedicated sealant flow channels around the molded sensor housing to maintain proper sealant contact with the electrical contacts
- Integration with the tire's inner liner reinforcement structure to ensure long-term durability Each integration method maintains the sensor's ability to accurately measure both pressure and sealant levels while ensuring the sensor's electrical contacts remain exposed to the tire's interior environment for proper functionality. The choice of integration method can be based on manufacturing capabilities, cost considerations, and whether the sensor is intended for factory installation or aftermarket addition.

Figure 3:
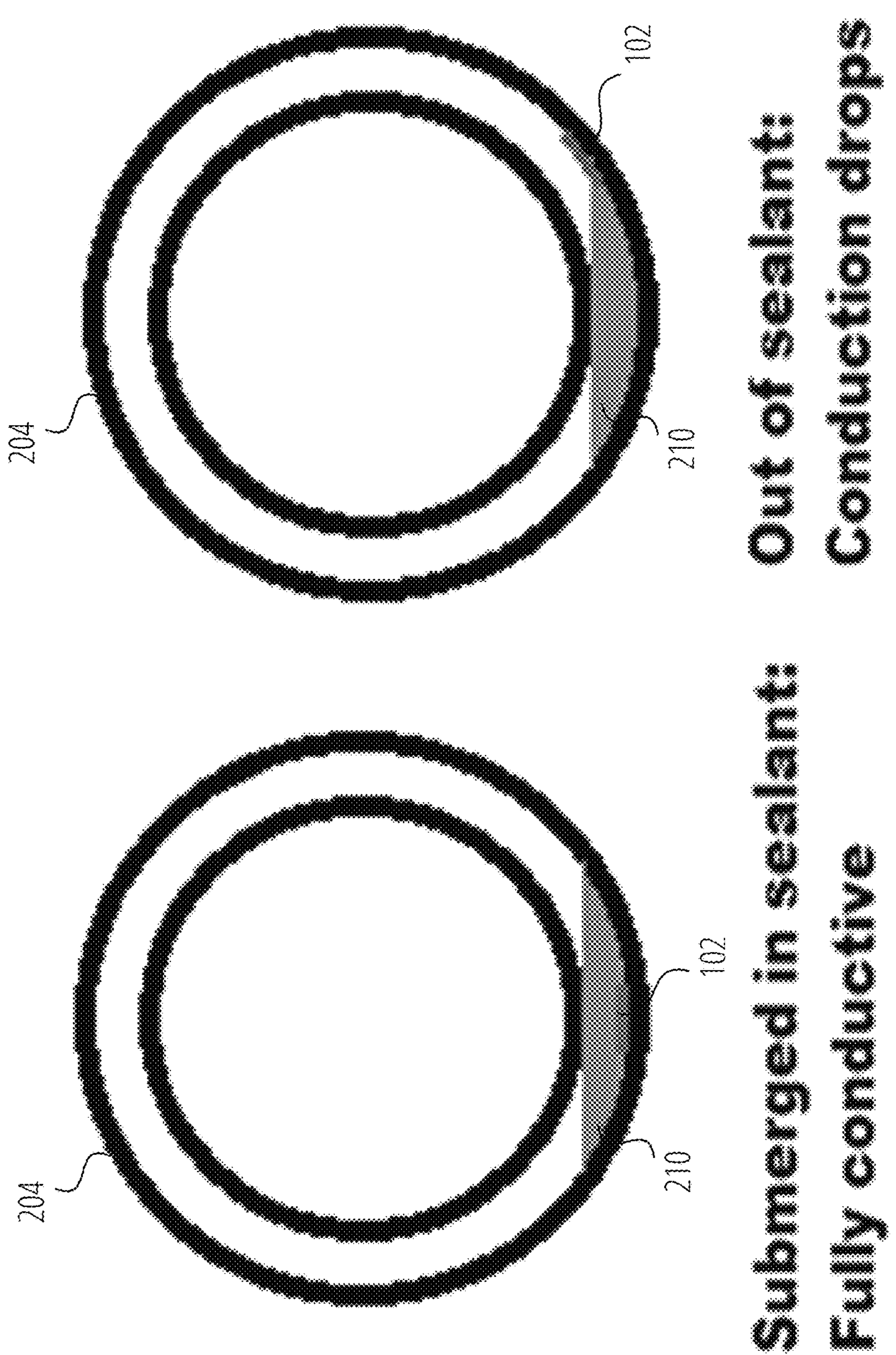
FIG. 3 presents two cross-sectional views illustrating a tubeless tire incorporating a sealant monitoring system, demonstrating how the monitoring system can indicate variable sealant distribution within the tire, according to some examples.

FIG. 3—Cross-Section Views of Tire 204

Referring to FIG. 3, two cross-sectional views of a tubeless tire incorporating a sealant monitoring system, according to some examples, are presented. Electrical contacts 126 that form part of a sensor pad, which is part of the wireless sensor module 102, are shown in two different states, each representing a different level of sealant within the tire 204.

In the right view, a portion of the sensor pad is depicted to indicate an area where the sealant level is low. This is represented by a drop in conduction between the electrical contacts 126 of the sensor pad, suggesting a lower sealant level at that segment. This drop in conduction is detected by the sealant sensor 116, which measures the electrical current flowing between the electrical contacts 126. When the sealant 210 level is low, the current flow between the electrical contacts 126 is reduced, resulting in a lower conductivity reading. This reading is then processed by the NFC processor 118 and transmitted to the external device (e.g., the mobile phone 110) via the wireless transmitter (e.g., the NFC reader to Bluetooth relay 106), providing an indication of the sealant level in that segment of the tire 204.

In the left view, the same sensor pad is depicted submerged in sealant 210 and thus fully conductive. This indicates a sufficient level of sealant at that location within the tire 204. When the sensor pad is fully submerged in sealants 210, the current flow between the electrical contacts 126 is maximized, resulting in a higher conductivity reading. This reading is then processed and transmitted in the same manner as described above, providing an indication of a sufficient sealant level in that segment of the tire 204.

Both views demonstrate how the monitoring system can indicate variable sealant distribution within the tire 204. By measuring the conductivity between the electrical contacts 126 at different locations within the tire 204, the system can provide a detailed map of the sealant distribution within the tire 204. This information can be invaluable for maintaining the performance and safety of the tire 204 as it allows the user to ensure that the sealant is evenly distributed throughout the tire 204 and to replenish the sealant if it falls below the recommended level in any segment of the tire 204.

In some cases, the wireless sensor module 102 may be configured to detect the level of sealant by rotating the tubeless tire 204 to move the sealant over the two or more electrical contacts 126 of the wireless sensor module 102. This rotation can cause the sealant to flow over the sensor pad, changing the conductivity reading and providing a dynamic measure of the sealant level within the tire 204. This method can provide a more accurate and comprehensive measure of the sealant level, as it takes into account the fluid nature of the sealant and its tendency to move around inside the tire 204.

Figure 4:
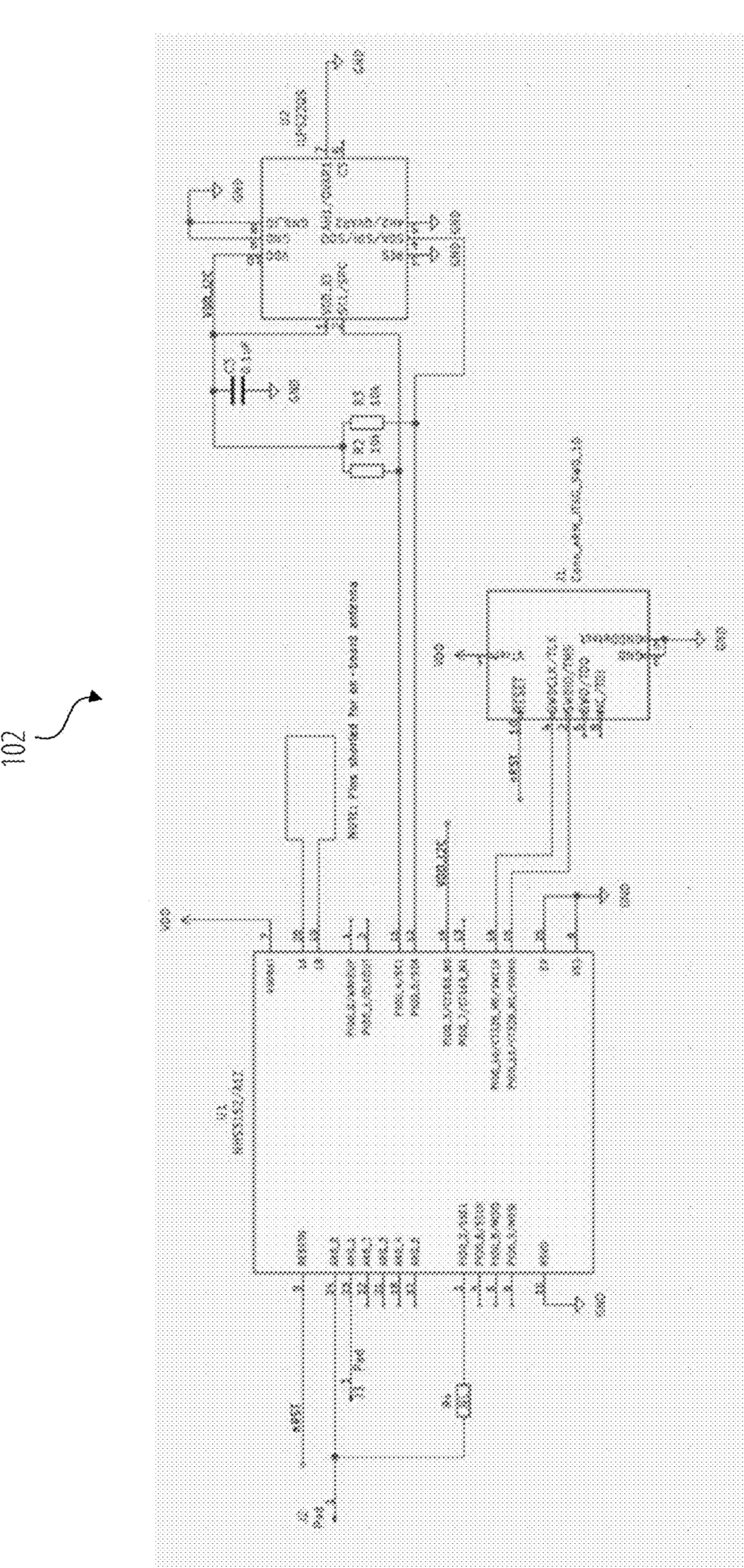
FIG. 4 is a circuit diagram illustrating a wireless sensor module, detailing its electrical connections and components, according to some examples.

FIG. 4—Circuit Diagram for Wireless Sensor Module 102

Referring to FIG. 4, a circuit diagram of a wireless sensor module 102, according to some examples, is illustrated, detailing its electrical connections and components. The wireless sensor module 102 is a compact and efficient device that is designed to measure the pressure and sealant levels inside a tubeless tire. It comprises several integral components that work in unison to monitor these parameters and transmit the data wirelessly to an external device.

The wireless sensor module 102 is connected to decoupling capacitors. These capacitors are designed to filter out any high-frequency noise in the power supply, ensuring a stable and clean power supply for the operation of the wireless sensor module 102. This can enhance the accuracy and reliability of the measurements taken by the wireless sensor module 102.

A Schottky diode is positioned within the circuit to regulate the flow of current within the system. The Schottky diode allows current to flow in one direction but blocks it in the opposite direction. This can prevent any reverse current flow that may potentially damage the components of the wireless sensor module 102.

Pin headers are integrated into the circuit, providing connection points for the various components of the wireless sensor module 102. These pin headers allow for easy assembly and disassembly of the components, facilitating maintenance and repair of the wireless sensor module 102. Additional pin headers are also provided to establish further connectivity options, enhancing the flexibility and adaptability of the wireless sensor module 102.

A communication port serves as an interface for data exchange between the wireless sensor module 102 and the external device. It is designed to facilitate the transmission of the pressure and sealant level data from the wireless sensor module 102 to the external device, enabling real-time monitoring of these parameters.

The wireless sensor module 102 and its components are partially encapsulated within a PCB potting sealant 108. This PCB potting sealant 108 provides a protective coating for the components, shielding them from moisture, corrosion, and other environmental conditions inside the tubeless tire. This can enhance the durability and longevity of the wireless sensor module 102, ensuring reliable operation over extended periods of time.

Figure 5:
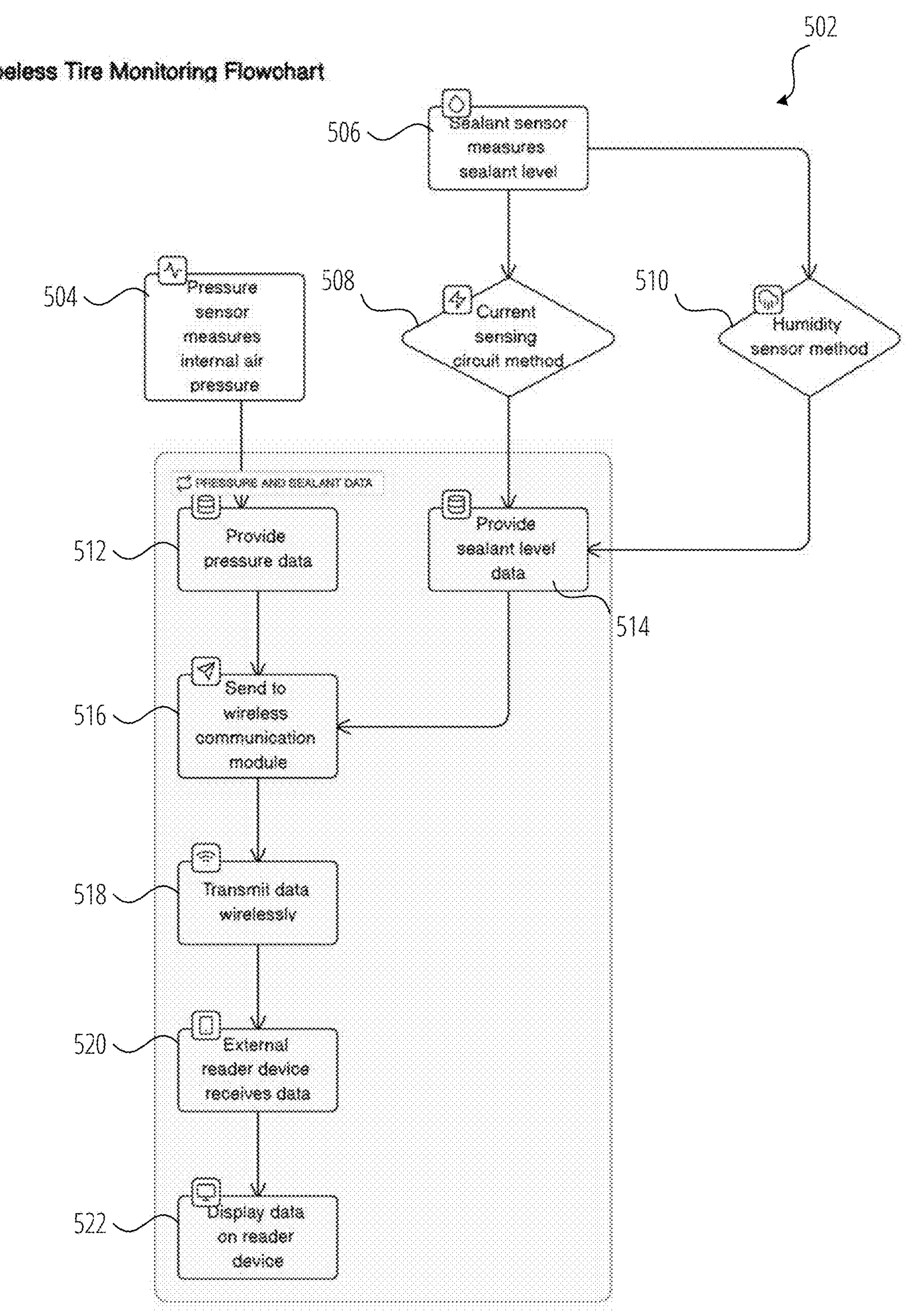
FIG. 5 is a flowchart illustrating the process of monitoring tire parameters in tubeless tires, according to some examples.

FIG. 5—Monitoring Tire Parameters in Tubeless Tires

Referring to FIG. 5, a flowchart illustrates a method 502, according to some examples, of monitoring tire parameters in tubeless tires. The method 502 begins with operation 504, where a pressure sensor 114 measures the internal air pressure of the tubeless tire 204. The pressure sensor 114, which can be a piezoresistive pressure sensor, measures the pressure based on the change in electrical resistance that occurs when mechanical strain is applied to the sensor. The pressure sensor 114 can measure pressures in a range of 5 to 60 PSI, making it suitable for monitoring the pressure levels in tubeless bicycle tires, which typically operate at lower pressures compared to automotive tires.

Simultaneously, the sealant level inside the tubeless tire may be measured using two methods.

The first method of measuring sealant levels in a tubeless tire involves the use of a sealant sensor 116, at operation 508. This sealant sensor 116 is designed to measure the level of sealant based on the principle of electrical conductivity. The sealant sensor 116 comprises two or more electrical contacts 126 of a pad that is strategically positioned within the tire 204. These electrical contacts 126 are made of a conductive material and are designed to come into direct contact with the sealant inside the tire.

As the level of sealant 210 in the tire 204 increases, the sealant begins to cover more of the electrical contacts. Given that the sealant is a conductive liquid, it allows for the flow of electrical current between the contacts. Consequently, as more sealant covers the contacts, the conductivity between the contacts increases. Conversely, when the level of sealant decreases, less of the contacts are covered by the sealant, leading to a decrease in conductivity.

This change in conductivity between the electrical contacts provides a direct and reliable indication of the sealant level inside the tubeless tire. The sealant sensor 116 continuously monitors the conductivity between the contacts, providing real-time data on the sealant level. This data is then processed and transmitted to an external device (e.g., the mobile phone 110), allowing the user to monitor the sealant level in real-time. This method 502 of sealant level detection, represented by operation 506 in the flowchart, provides a simple, accurate, and efficient solution for monitoring sealant levels in tubeless tires.

The second method for measuring the sealant level in a tubeless tire 204 involves the use of a humidity sensor 122, as depicted in operation 510 of the flowchart. This method is based on the principle that the presence of sealant inside the tire increases the humidity level within the tire's interior. The humidity sensor 122, which is a part of the wireless sensor module 102, is designed to detect this increase in humidity.

As the sealant is a liquid substance, it naturally increases the humidity level inside the tire. This increase in humidity is directly proportional to the amount of sealant present in the tire. Therefore, by detecting the humidity level, the humidity sensor can indirectly measure the level of sealant inside the tire. This indirect measurement of sealant level provides an additional layer of information, enhancing the accuracy and reliability of the sealant level measurement.

This method of sealant level detection may be particularly useful in situations where the sealant is unevenly distributed within the tire 204 or where the sealant level changes rapidly due to factors such as evaporation or leakage. In such situations, the humidity sensor 122 can provide a more accurate and reliable measure of the overall sealant level within the tire, compared to methods that rely on direct contact with the sealant.

Furthermore, the use of a humidity sensor 122 for sealant level detection also has the advantage of being non-invasive and less prone to interference from the sealant 210 itself. Unlike methods that involve direct contact with the sealant, the humidity sensor 122 does not risk being coated or blocked by the sealant, which can affect the accuracy of the measurements. This makes the humidity sensor 122 a robust and reliable solution for monitoring sealant levels in tubeless tires.

Once the pressure and sealant level data are measured, they are provided to a wireless communication module (e.g., the NFC reader to Bluetooth relay 106), as represented by operation 512 through operation 516. The wireless sensor module 102 is configured to transmit the data corresponding to the measured pressure and sealant level. This data transmission is represented by operation 518 in the flowchart 502.

The transmitted data is then received by an external reader device (e.g., the mobile phone 110 running the application 112). The external reader device can be a mobile phone or any other device equipped with NFC or Bluetooth capabilities. The reader device decodes the received data and extracts the pressure and sealant level information.

Finally, the pressure and sealant level data are displayed on the reader device, as represented by operation 522 in the flowchart 502. This display can be on a mobile application or any other user interface that can present the data in a readable and understandable format. This completes the monitoring process, providing the user with real-time information about the pressure and sealant level inside the tubeless tire.

Figure 6:
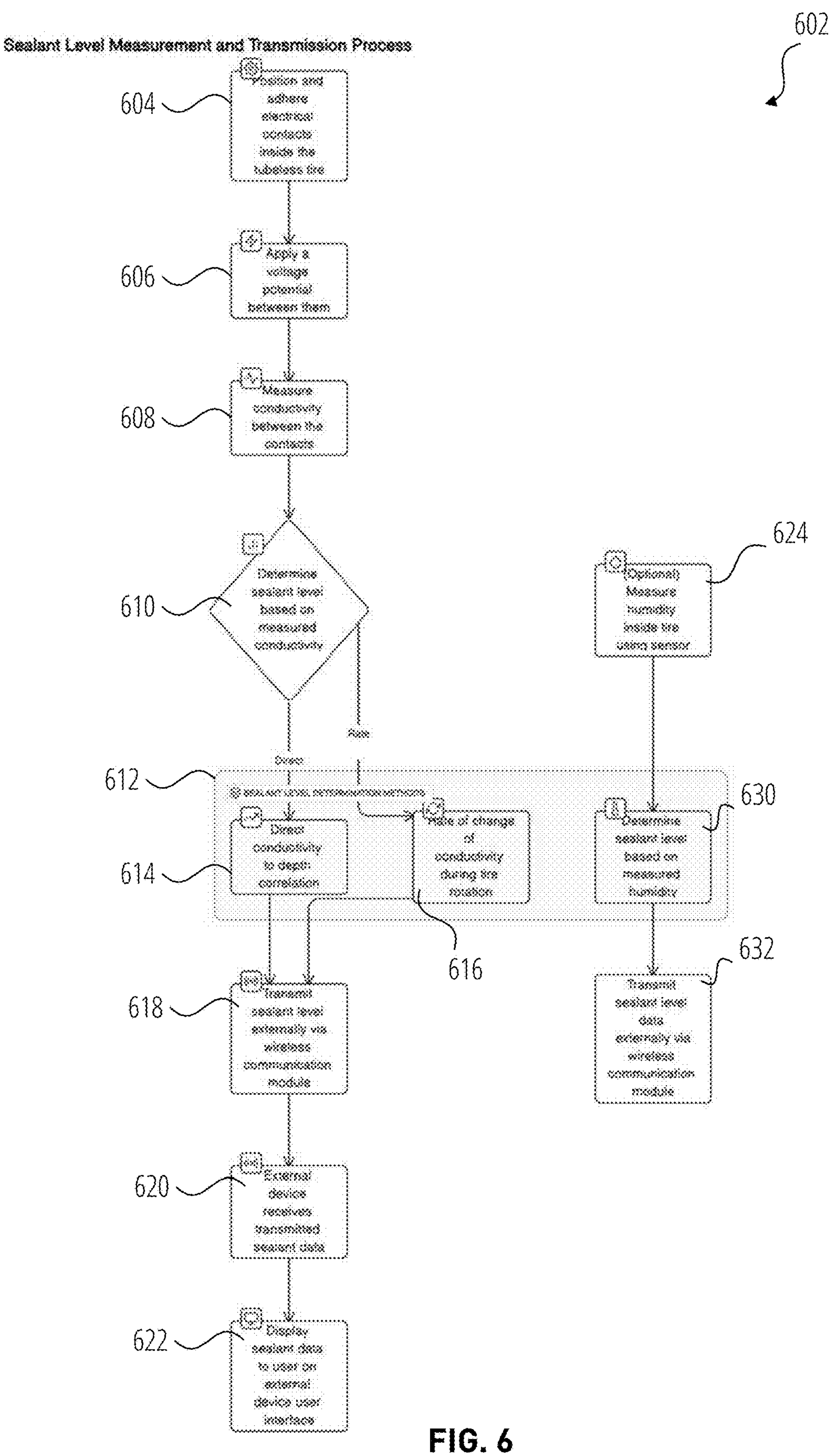
FIG. 6 is a flowchart illustrating a sealant level measurement and transmission method within a tubeless tire system, according to some examples.

FIG. 6—Sealant Level Measurement and Transmission

Referring to FIG. 6, a flowchart outlines a sealant level measurement and transmission method 602, according to some examples, within a tubeless tire system. The process begins with operation 604, where electrical contacts 126 are positioned inside the tubeless tire 204. These electrical contacts 126, which are part of the sealant sensor 116, are designed to detect the presence and amount of sealant 210 within the tire 204 based on its ability to conduct electrical current.

Following the positioning of the electrical contacts, a voltage is applied between them during operation 606. This voltage generates an electrical current that flows between the electrical contacts. The magnitude of this current is directly related to the conductivity between the electrical contacts, which in turn is influenced by the level of sealant present between the contacts.

In some scenarios, the sealant sensor 116 may utilize a technique where a voltage is applied to the electrical contacts 126 to induce a pulsing current. This method involves applying a voltage across the electrical contacts in a periodic manner, causing the current to flow in pulses rather than continuously. The pulsing current can provide more detailed information about the sealant level, as it allows for the detection of changes in conductivity over time. This can be particularly useful in situations where the sealant level is changing rapidly, such as during the sealing of a puncture or the addition of new sealant. By monitoring the pulsing current, the system can track these changes in real-time and provide more accurate and timely information about the sealant level.

This pulsing current technique leverages the conductive properties of the sealant to provide a dynamic measure of the sealant level. When the sealant level is high, the pulsing current is strong, indicating a high conductivity between the contacts. Conversely, when the sealant level is low, the pulsing current is weak, indicating a low conductivity between the contacts. This direct correlation between the pulsing current and the sealant level allows for accurate and real-time monitoring of the sealant level.

Furthermore, the pulsing current technique is particularly useful in dynamic situations where the sealant level is changing rapidly. For instance, when a puncture occurs, the sealant rushes to the puncture site to seal it. This rapid movement of the sealant can cause a sudden change in the sealant level at the sensor location. The pulsing current technique can detect this rapid change, providing real-time information about the puncture event and the effectiveness of the sealant in sealing the puncture.

Similarly, when new sealant is added to the tire, it can cause a sudden increase in the sealant level. The pulsing current technique can detect this sudden increase, providing real-time information about the addition of the new sealant and its distribution within the tire. This real-time information can be invaluable for maintaining the performance and safety of the tire, as it allows the user to ensure that the sealant is evenly distributed throughout the tire and to replenish the sealant if it falls below the recommended level in any segment of the tire.

In some instances, the sealant sensor 116 may employ a technique where a voltage is applied to the electrical contacts to induce a modulated current. This method involves applying a voltage across the electrical contacts in a cyclical manner, causing the current to flow in waves rather than continuously. The wave-like current can provide more nuanced information about the sealant level, as it allows for the detection of subtle changes in conductivity over time. This can be particularly useful in situations where the sealant level is fluctuating rapidly, such as during the sealing of a puncture or the addition of new sealant. By monitoring the wave-like current, the system can track these changes in real-time and provide more accurate and timely information about the sealant level.

In some examples, the sealant sensor 116 may utilize a technique where a voltage is applied to the electrical contacts to induce a stepped current. This method involves applying a voltage across the electrical contacts in a stepwise manner, causing the current to flow in steps rather than continuously. The stepped current can provide more detailed information about the sealant level, as it allows for the detection of changes in conductivity over time. This can be particularly useful in situations where the sealant level is changing rapidly, such as during the sealing of a puncture or the addition of new sealant. By monitoring the stepped current, the system can track these changes in real-time and provide more accurate and timely information about the sealant level.

In some examples, the sealant sensor 116 may employ a technique where a voltage is applied to the electrical contacts to induce a ramped current. This method involves applying a voltage across the electrical contacts in a ramped manner, causing the current to flow in a ramp-like pattern rather than continuously. The ramped current can provide more detailed information about the sealant level, as it allows for the detection of changes in conductivity over time. This can be particularly useful in situations where the sealant level is changing rapidly, such as during the sealing of a puncture or the addition of new sealant. By monitoring the ramped current, the system can track these changes in real-time and provide more accurate and timely information about the sealant level.

In some scenarios, the sealant sensor 116 may utilize a technique where a voltage is applied to the electrical contacts to induce a sinusoidal current. This method involves applying a voltage across the electrical contacts in a sinusoidal manner, causing the current to flow in a sinusoidal pattern rather than continuously. The sinusoidal current can provide more detailed information about the sealant level, as it allows for the detection of changes in conductivity over time. This can be particularly useful in situations where the sealant level is changing rapidly, such as during the sealing of a puncture or the addition of new sealant. By monitoring the sinusoidal current, the system can track these changes in real-time and provide more accurate and timely information about the sealant level.

The resulting conductivity between the electrical contacts is then measured in operation 608. This measurement is performed by the current sensor 130, which is electrically connected to the electrical contacts. The current sensor 130 measures the electrical current flowing between the electrical contacts, providing a direct indication of the conductivity between the contacts.

Based on the measured conductivity, the sealant level inside the tubeless tire 204 is determined in operation 610. This determination can be made using one of two methods. The first method involves a direct correlation between the conductivity and the depth of the sealant, as represented by operation 614. In this method, a higher conductivity corresponds to a higher sealant level, and vice versa.

The second method involves an assessment based on the rate of change of conductivity during tire rotation, as represented by operation 616. In this method, the tubeless tire 204 is rotated, causing the sealant 210 to move over the electrical contacts 126. As the sealant moves, the conductivity between the contacts changes, and this change in conductivity is used to determine the sealant level.

An optional method for determining the sealant level is also shown at operation 624-operation 626, which involves measuring the humidity inside the tire using a humidity sensor 122. This method is based on the observation that the presence of sealant inside the tire increases the humidity level. Therefore, by detecting the humidity level inside the tire, the sensor can indirectly measure the sealant level.

Once the sealant level has been determined, it is transmitted externally via a wireless communication module during operation 618 and operation 632. This wireless communication wireless sensor module 102, which can be a near field communication (NFC) transmitter or a Bluetooth transmitter, is configured to transmit the sealant level data to an external device.

The transmitted data is then received by an external device during operation 620. The external device can be a mobile phone 110 or any other device equipped with NFC or Bluetooth capabilities. The device decodes the received data and extracts the sealant level information.

Finally, the sealant level data is displayed to the user on the external device's user interface during operation 622. This display can be on a mobile application or any other user interface that can present the data in a readable and understandable format. This completes the monitoring process, providing the user with real-time information about the sealant level inside the tubeless tire.

Figure 7:
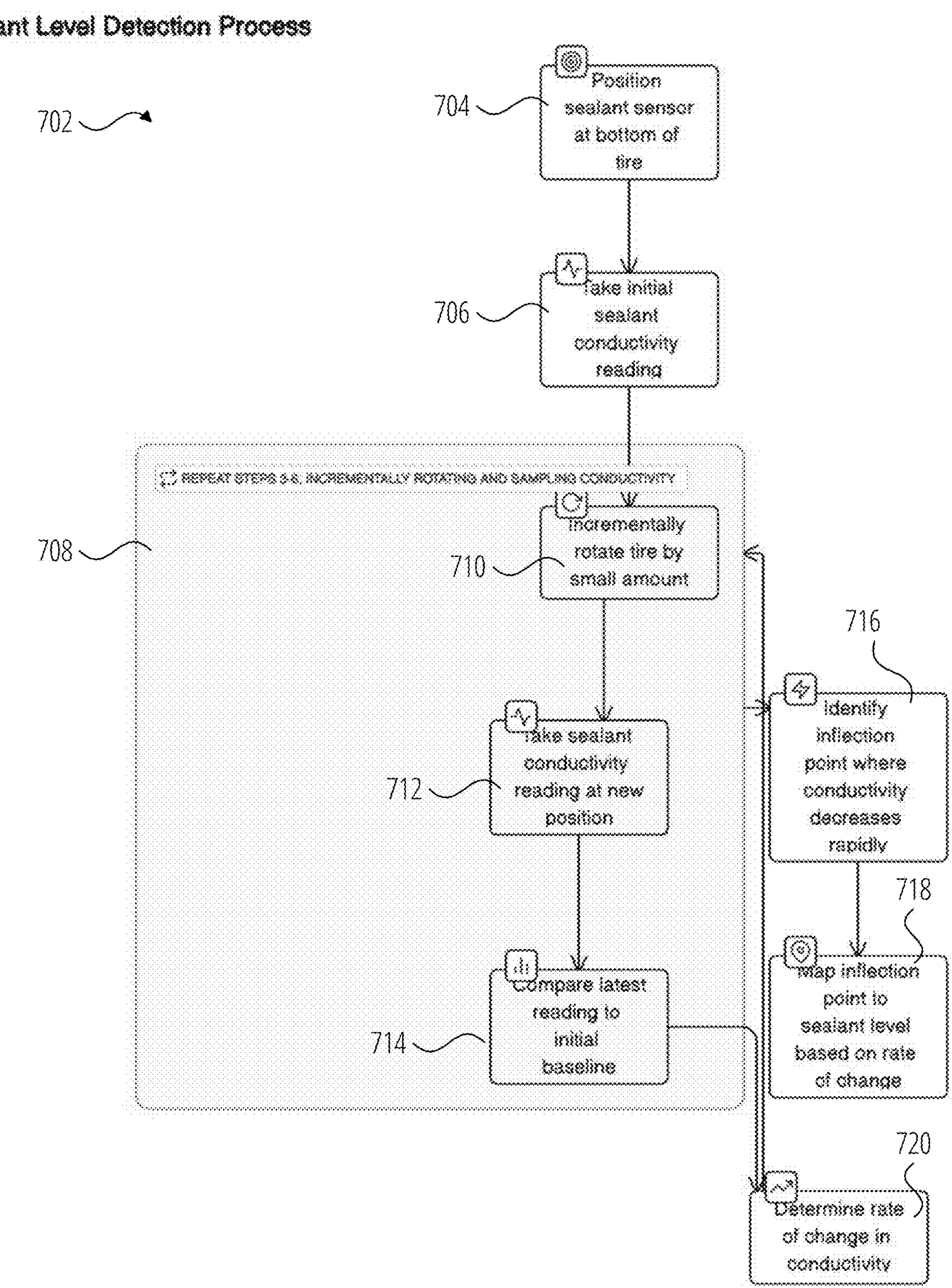
FIG. 7 is a flowchart illustrating a sealant-level detection method for a tire, according to some examples.

FIG. 7—Sealant-Level Detection Method 702 for a Tire

Referring to FIG. 7, a flowchart outlines a sealant-level detection method 702, according to some examples, for a tire. The method 702 starts with operation 704, which involves positioning the sealant sensor 116 at the bottom of the tire 204. The sealant sensor 116, which is part of the wireless sensor module 102, is designed to detect the presence and amount of sealant 210 within the tire 204 based on its ability to conduct electrical current.

Once the sealant sensor 116 is positioned, operation 706 is performed, which involves taking an initial sealant conductivity reading. This reading is taken by a current sensor, which measures the electrical current flowing between the electrical contacts 126 of the sealant sensor 116. The magnitude of this current is directly related to the conductivity between the electrical contacts 126, which in turn is influenced by the level of sealant present between the contacts.

The process then proceeds to operation 710, which involves incrementally rotating the tire 204 by a small amount. This rotation can cause the sealant 210 to move over the electrical contacts of the sealant sensor 116 (as shown in FIG. 3), changing the conductivity reading. After each minor rotation, operation 712 is performed to take a sealant conductivity reading at the new position. This reading is compared to the initial baseline reading during operation 714.

The next steps include operation 716, which involves identifying an inflection point where conductivity decreases rapidly. This inflection point may correspond to the point at which the sealant 210 begins to slide off the electrical contacts 126 due to gravity. This change in sealant contact with the sealant sensor 116 is detected by the current sensor, which observes a decrease in conductivity between the electrical contacts 126. This decrease in conductivity is directly related to the reduction in sealant coverage on the electrical contacts 126.

Following the identification of the inflection point, operation 718 is performed to map the inflection point to the sealant level based on the rate of change of conductivity. The rate of change of conductivity is determined in operation 720, indicating the sealant level within the tire. By carefully monitoring the change in conductivity as the tire is rotated, the system can determine the point at which the sealant begins to slide off the contacts. This point corresponds to the depth of the sealant within the tire. Therefore, this level readout functionality provides a means to check the depth of the sealant within the tire, offering a more comprehensive understanding of the sealant level.

Figure 8:
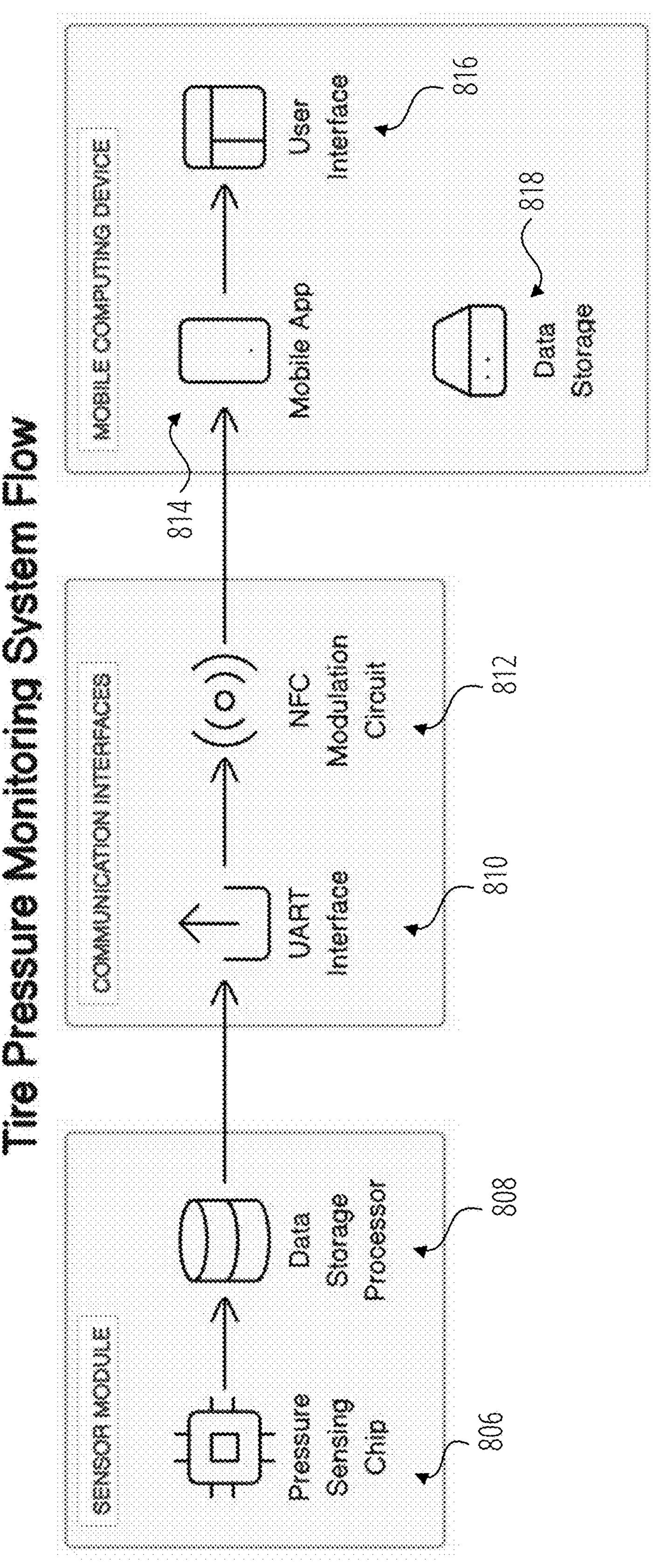
FIG. 8 is a block diagram illustrating a tire pressure monitoring system flow, which begins with a pressure-sensing chip detecting the tire pressure, according to some examples.

FIG. 8—Tire Pressure Monitoring System 802

Referring to FIG. 8, a block diagram of a tire pressure monitoring system 802, according to some examples, is presented. A process begins with a pressure-sensing chip 806 of the tire pressure sensor module 104 detecting the tire pressure. The pressure-sensing chip 806 is designed to measure the pressure inside the tubeless tire. In some cases, the pressure-sensing chip 806 may be a piezoresistive pressure sensor, which measures pressure based on the change in electrical resistance that occurs when mechanical strain is applied to the sensor. The pressure-sensing chip 806 can measure pressures in a range of 5 to 60 PSI, making it suitable for monitoring the pressure levels in tubeless bicycle tires, which typically operate at lower pressures compared to automotive tires.

The measured pressure data is then encapsulated into a data packet. This data packet contains the raw pressure data from the pressure-sensing chip 806, which is then processed by a data storage processor 808. The data storage processor 808 is designed to process the raw pressure data and prepare it for transmission. This processing may involve various operations such as filtering, amplification, or digitization, depending on the specific requirements of the system.

The processing of sensor data is a complex task that involves several operations, each designed to enhance the quality and usability of the data. These operations can vary depending on the specific requirements of the system, but they generally include filtering, amplification, and digitization.

Filtering is an operation that removes unwanted components or features from the sensor data. This may include noise or interference that may distort the data and lead to inaccurate readings. By filtering out these unwanted components, the system can ensure that the sensor data is clean and accurate, enhancing the reliability of the measurements.

Amplification is another operation that can be applied to the sensor data. This operation increases the magnitude of the sensor data, making it easier to analyze and interpret. Amplification can be particularly useful when the sensor data is weak or faint, such as when the tire pressure or sealant level is low. By amplifying the sensor data, the system can ensure that even small changes in tire pressure or sealant level can be detected and monitored.

Digitization is the process of converting the sensor data into a digital format that can be processed by a computer. This operation may be needed for wireless transmission, as the sensor data has to be in a digital format to be encoded into a wireless signal. Digitization also allows for the sensor data to be stored and analyzed using digital tools and algorithms, enhancing the flexibility and capabilities of the system.

By applying these operations, the system 802 can ensure that the sensor data is accurate, readable, and ready for wireless transmission, enabling real-time monitoring of tire pressure and sealant levels.

Once the pressure data has been processed, it is transmitted to a UART (universal asynchronous receiver-transmitter) interface 810. The UART interface 810 serves as a communication interface between the data storage processor and the NFC modulation circuit.

The Universal Asynchronous Receiver-Transmitter (UART) interface 810 plays a role in the wireless transmission of the processed pressure data. The UART interface 810 is specifically designed to encode the processed pressure data into a format that is compatible with wireless transmission protocols. This encoding process involves converting the processed pressure data, which is in a digital format, into a series of signals that can be transmitted wirelessly. These signals represent the binary values of the processed pressure data, allowing the data to be transmitted as a series of high and low signals.

Furthermore, the UART interface 810 also manages the timing of the wireless transmission. It ensures that the signals are transmitted at a consistent rate, which is known as the baud rate. This consistent rate of transmission allows the receiving device to accurately interpret the signals and reconstruct the original pressure data. The UART interface 810 also manages the start and stop bits for each byte of data, which signal the beginning and end of each byte to the receiving device. This ensures that the receiving device can accurately separate each byte of data and correctly interpret the transmitted pressure data.

Overall, the UART interface 810 provides a robust and reliable method for encoding the processed pressure data into a format that can be transmitted wirelessly. This enables the wireless transmission of real-time pressure data from the sensor module to an external device, providing the user with up-to-date information about the tire pressure.

The encoded pressure data is then passed on to the NFC modulation circuit 812. The NFC modulation circuit 812 is responsible for modulating the encoded pressure data onto an NFC signal for wireless transmission. The NFC modulation circuit 812 can use various modulation schemes, such as amplitude shift-keying or phase shift-keying, depending on the specific requirements of the system.

The modulated NFC signal is then transmitted to a mobile computing device application 814. The mobile computing device application 814 can be a software application running on a mobile device, such as a smartphone or tablet. The mobile computing device application 814 is designed to receive the NFC signal, demodulate it to extract the encoded pressure data, and decode the pressure data to obtain the original pressure measurements.

The mobile computing device application 814 then displays the pressure data on a user interface 816. The user interface 816 can be a graphical user interface that presents the pressure data in a readable and understandable format. This can include numerical displays, graphical plots, or other visual representations of the pressure data. The user interface can also provide alerts or notifications if the pressure data indicates that the tire pressure is outside of a specified range.

In addition to displaying the pressure data, the mobile computing device application 814 also manages the storage and retrieval of the tire pressure data. The tire pressure data can be stored in a data storage 818, which can be a memory device or a database. The data storage 818 allows the pressure data to be stored for later retrieval and analysis. This can be useful for tracking the tire pressure over time, identifying trends or patterns, or diagnosing potential issues.

Overall, the tire pressure monitoring system 802 provides a comprehensive solution for wirelessly monitoring the tire pressure in tubeless tires. By integrating a pressure-sensing chip 806, a data storage processor 808, a UART interface 810, an NFC modulation circuit 812, a mobile computing device application 814, and a data storage 818, the system 802 can measure the tire pressure, process the pressure data, transmit the pressure data wirelessly, and display the pressure data to the user in real-time.

Figure 9:
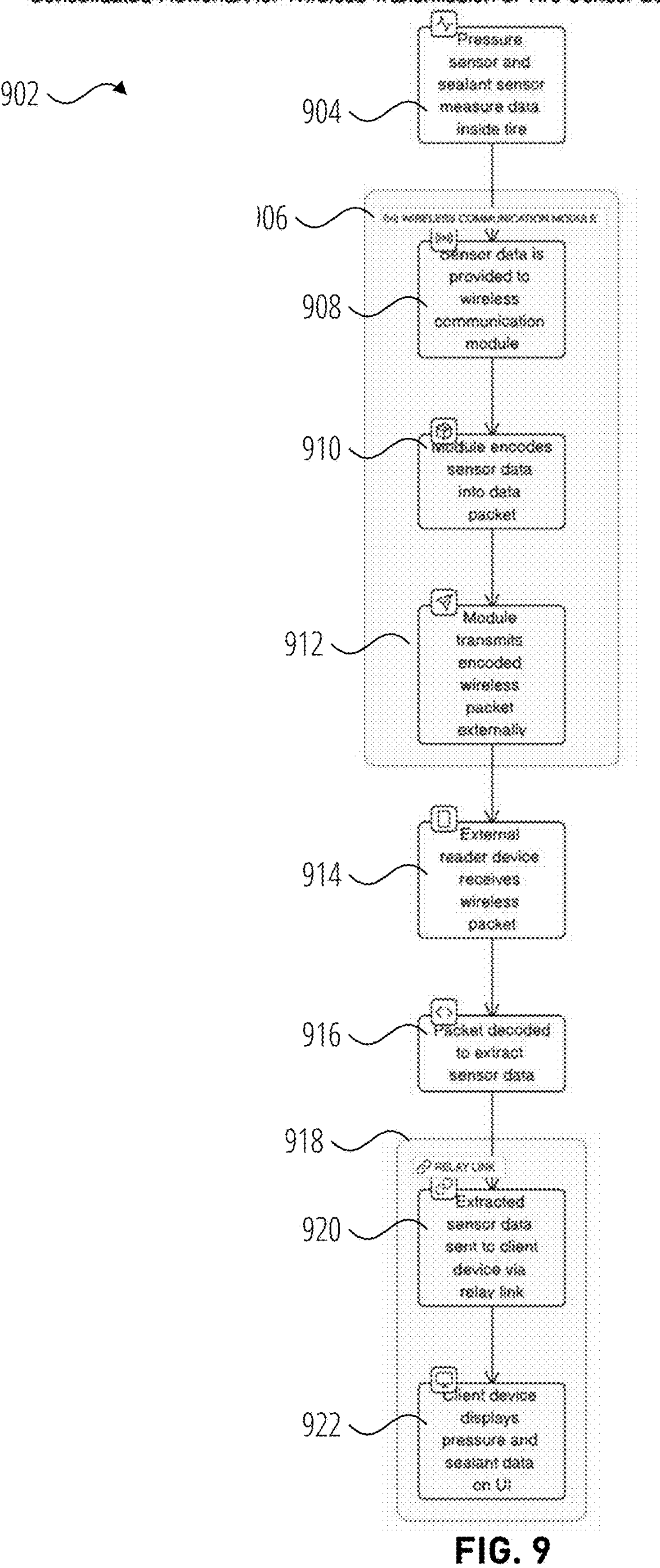
FIG. 9 is a flowchart illustrating the wireless transmission of tire sensor data, according to some examples.

FIG. 9—Wireless Transmission of Tire Sensor Data

Referring to FIG. 9, a flowchart illustrates a method 902, according to some examples, for the wireless transmission of tire sensor data. The method 902 begins with operation 904, where tire pressure and sealant sensors measure relevant data inside the tire. These sensors, which can be part of the wireless sensor module 102, are designed to detect the pressure and sealant level within the tire. The pressure sensor 114 measures the pressure based on the change in electrical resistance that occurs when mechanical strain is applied to the sensor, while the sealant sensor 116 measures the sealant level based on the conductivity between two or more electrical contacts.

Once the pressure and sealant level data are measured, they are sent to a wireless communication module. This wireless communication module, which can be a near field communication (NFC) transmitter or a Bluetooth transmitter (e.g., NFC reader to Bluetooth relay 106), is configured to receive the sensor data and prepare it for external transmission at operation 910. This preparation may involve various operations such as filtering, amplification, or digitization, depending on the specific requirements of the system.

The wireless communication module then sends the sensor data externally at operation 908 This external transmission can be achieved using various wireless communication technologies, such as NFC or Bluetooth. The choice of communication technology can depend on various factors, such as the range, power consumption, and data rate requirements of the system.

In the next step, operation 910, the raw sensor data is encoded into a data packet. This encoding process transforms the raw sensor data into a format that can be transmitted wirelessly. The encoding process can involve various operations, each designed to enhance the integrity and security of the sensor data during transmission.

One such operation is error correction coding. Error correction coding is a technique used to detect and correct errors that may occur during data transmission. It involves adding extra bits to the data, known as parity bits, which are used to check the accuracy of the data when it is received. If any errors are detected, the error correction code can use the parity bits to correct the errors, ensuring that the received data is accurate and reliable.

Data compression is another operation that can be used during the encoding process. Data compression is a technique used to reduce the size of the data, making it more efficient to transmit. It involves removing redundant or unnecessary information from the data, resulting in a compressed version of the data that requires less bandwidth to transmit. Despite the reduction in size, the compressed data still contains all the information of the original data, ensuring that no information is lost during transmission.

Encryption is a third operation that can be used during the encoding process. Encryption is a technique used to secure the data during transmission, protecting it from unauthorized access or tampering. It involves transforming the data into a coded form, known as ciphertext, which can be decoded back into the original data using a decryption algorithm and a secret decryption key. Only those with the correct decryption can access the original data, ensuring that the data remains secure during transmission.

Once the sensor data has been encoded, it is encapsulated into a wireless packet. This encapsulation process involves packaging the encoded data into a specific format that can be transmitted wirelessly. The wireless packet contains the encoded sensor data, along with other information such as the packet header and footer, which are used to manage the transmission and reception of the packet. Once encapsulated, the wireless packet is ready for external transmission, marking the completion of the encoding and encapsulation process.

Operation 912 transmits the encoded wireless packet externally. This transmission can be achieved using various wireless communication technologies, such as NFC or Bluetooth. The wireless packet is transmitted to an external reader device, which can be a mobile phone or any other device equipped with NFC or Bluetooth capabilities.

An external reader device receives the wireless packet in operation 914. The reader device is designed to receive the wireless packet, demodulate it to extract the encoded sensor data, and decode the sensor data to obtain the original pressure and sealant level measurements.

The decoded sensor data is then extracted in operation 916. This extraction process can involve various operations, such as error correction decoding, data decompression, or decryption, to recover the original sensor data from the encoded sensor data. The extracted sensor data includes the pressure and sealant level measurements taken by the sensors inside the tire.

This extracted sensor information is sent to the client device via a relay link in operation 920. The client device can be a mobile phone or any other device equipped with NFC or Bluetooth capabilities. The client device receives the sensor information and processes it for display.

The process culminates in operation 922, where a client device displays the pressure and sealant data on a user interface. This user interface can be a graphical user interface that presents the pressure and sealant data in a readable and understandable format.

The user interface of the mobile application is designed to present the pressure and sealant data in a user-friendly and intuitive manner. This can include numerical displays, which provide a straightforward and easily understandable representation of the data. For instance, the tire pressure can be displayed as a numerical value in PSI (pounds per square inch), allowing the user to quickly check the current tire pressure at a glance.

Additionally, the user interface can also feature graphical plots, which provide a visual representation of the data over time. These plots can be particularly useful for tracking changes in the tire pressure and sealant level, helping the user to identify trends or patterns. For example, a line graph may be used to plot the tire pressure over time, allowing the user to see how the pressure changes during a ride or over several rides. Similarly, a bar graph may be used to display the sealant level, showing the user how the sealant level has fluctuated over a period of time.

Beyond numerical displays and graphical plots, the user interface can also include other visual representations of the pressure and sealant data. These may include color-coded indicators, gauge-style displays, or even 3D models of the tire showing the distribution of the sealant within the tire. These visual representations can provide a more intuitive understanding of the data, making it easier for the user to interpret and act upon the information.

Furthermore, the user interface is designed to provide alerts or notifications if the pressure or sealant data indicates that the tire pressure or sealant level is outside of a specified range. These alerts can be visual, such as flashing indicators or pop-up messages on the screen, or auditory, such as beeps or alarms. The alerts can also be customized based on the user's preferences, allowing the user to set the threshold values for the tire pressure and sealant level that will trigger an alert. This feature ensures that the user is promptly notified of any potential issues, allowing them to take immediate action to address the problem and maintain the performance and safety of the tire.

In addition to the aforementioned user interface features, the mobile application may also include a historical data section. This section may display past pressure and sealant data, allowing the user to track changes over time and identify any long-term trends or patterns. The historical data may be presented in various formats, such as tables, line graphs, or bar charts, providing a comprehensive overview of the tire's performance history.

The user interface may also feature an interactive 3D model of the tire, which may provide a more detailed and intuitive representation of the sealant distribution within the tire. The user may rotate and zoom in on the 3D model to examine specific areas of the tire, enhancing their understanding of the sealant level and distribution.

Furthermore, the user interface may include a predictive alert system. This system may analyze the historical pressure and sealant data to predict future trends and provide early warnings if the pressure or sealant level is predicted to fall outside of the specified range. This predictive alert system may help the user to proactively manage the tire's performance and safety, preventing potential issues before they occur.

The user interface may also include a tutorial or guide section. This section may provide instructions and tips on how to maintain the tire pressure and sealant level, enhancing the user's understanding and management of the tire's performance. The guide section may include video tutorials, step-by-step instructions, or interactive simulations, providing a comprehensive and user-friendly resource for tire maintenance.

Additionally, the user interface may include a settings section. This section may allow the user to customize various aspects of the application, such as the alert thresholds, display preferences, or notification settings. This customization may enhance the user's experience and interaction with the application, allowing them to tailor the application to their specific preferences and requirements.

The user interface may also include a feedback section. This section may allow the user to provide feedback on the application, such as reporting bugs, suggesting improvements, or rating the application. This feedback may be valuable for the continuous improvement and development of the application, ensuring that it meets the user's expectations and requirements.

Moreover, the user interface may include a troubleshooting section. This section may provide solutions and advice for common issues or problems that the user may encounter with the tire or the application. This troubleshooting section may enhance the user's experience and satisfaction with the application, providing a valuable resource for resolving issues and ensuring the smooth operation of the tire and the application.

Data Processing and Analysis

The wireless sensor module 102, in some examples, implements data processing algorithms to analyze sensor measurements and provide meaningful insights to users. The processing begins with the analysis of sealant level data, where a processing chip employs both static and dynamic threshold comparisons to evaluate conductivity measurements between the electrical contacts 126.

This dual-analysis approach provides a comprehensive view of the sealant condition within the tire 204. The static analysis establishes baseline measurements by comparing absolute conductivity values against predetermined thresholds that indicate critical sealant levels. These thresholds are calibrated to account for variations in sealant conductivity and environmental conditions.

A dynamic analysis component examines the temporal changes in conductivity during tire rotation, providing insights into sealant distribution patterns. This process begins with establishing a baseline conductivity measurement at the tire's resting position, followed by sequential measurements taken during incremental tire rotation. The system specifically monitors for rapid conductivity changes that indicate sealant movement, mapping these inflection points to determine actual sealant depth. To enhance measurement accuracy, the system may correlate these readings with data from the humidity sensor 122, providing an additional validation mechanism for sealant level determination.

Pressure analysis within the system involves processing of data from the pressure sensor 114. The processing algorithm validates pressure readings within the operational range of 5-60 PSI while incorporating temperature compensation using data from the temperature sensor 124. This temperature compensation ensures accurate pressure readings across varying environmental conditions. The system maintains a historical record of pressure measurements, enabling trend analysis that can identify gradual pressure changes that might otherwise go unnoticed.

An alert generation system may process data streams from multiple sensors to provide timely and relevant notifications to users. The sealant level alert system continuously monitors conductivity measurements, triggering alerts when sealant levels fall below critical thresholds. Similarly, the tire pressure alert system processes pressure sensor data to identify both immediate pressure issues and concerning trends over time. These alerts are designed to be proactive rather than reactive, helping users maintain optimal tire conditions.

Data integration represents an aspect of the system's processing capabilities. The NFC processor 118 serves as the central hub for integrating data from multiple sensors, including the pressure sensor 114, sealant sensor 116, humidity sensor 122, and temperature sensor 124. This integrated approach allows for comprehensive tire health assessment by correlating data from multiple sources. The processed data undergoes encoding into NDEF message packets for efficient transmission to the mobile phone 110 via the NFC reader to Bluetooth relay 106, where the application 112 presents the analyzed data in an intuitive format.

Figure 10:
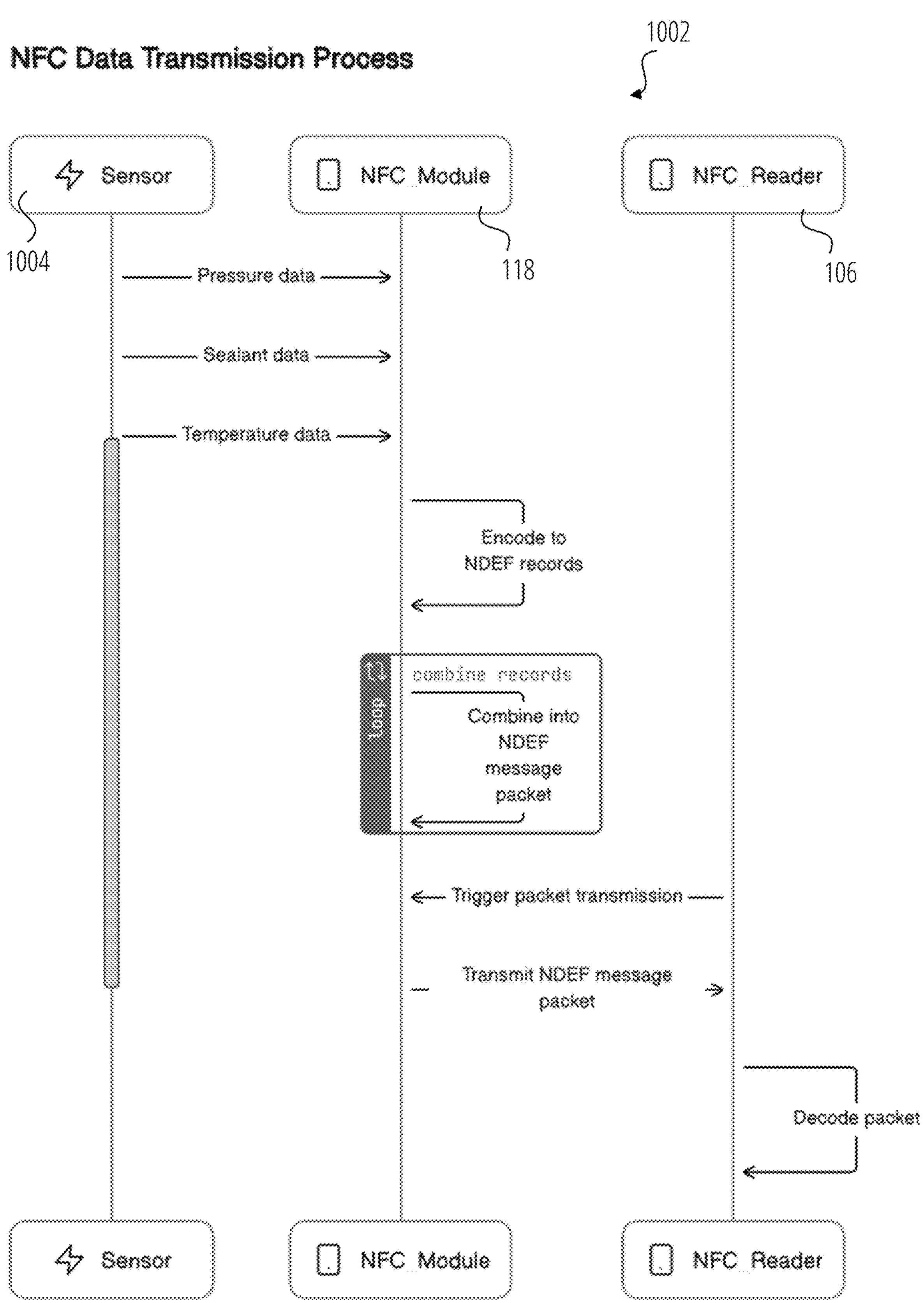
FIG. 10 is a flowchart illustrating a near field communication (NFC) Data Transmission Process which outlines operations involved in transmitting data from a sensor to an NFC reader, according to some examples.

FIG. 10—NFC Data Transmission Method 1002

Referring to FIG. 10, a flowchart of an NFC Data Transmission method 1002, according to some examples, is illustrated, outlining the operations involved in transmitting data from a sensor to an NFC reader. The process begins with the sensors 1004, which include a pressure sensor, a sealant sensor, a temperature sensor, or any other type of sensor suitable for monitoring conditions inside a tubeless tire. The sensors 1004 measure the relevant parameter, such as pressure, sealant level, or temperature, and send this data to the NFC processor 118.

The NFC processor 118, which can be part of the wireless sensor module 102, is responsible for processing the sensor data and preparing it for wireless transmission. The NFC processor 118 encodes the sensor data into NDEF (NFC Data Exchange Format) records. NDEF is a standard data format that is used for communication between NFC devices. The encoded sensor data is then combined into an NDEF message packet. This packet encapsulates the sensor data in a format that can be transmitted wirelessly and understood by the NFC reader to Bluetooth relay 106.

Once the NDEF message packet has been prepared, the NFC processor 118 transmits the packet to the NFC reader to Bluetooth relay 106. This transmission is achieved using NFC technology, which allows for short-range wireless communication between devices. The NFC reader to Bluetooth relay 106 receives the NDEF message packet and decodes it to extract the sensor data.

The decoding process involves reversing the encoding process performed by the NFC processor 118. The NDEF message packet is unpacked to extract the NDEF records, and the sensor data is then decoded from the NDEF records. This decoded sensor data includes the pressure, sealant level, and temperature measurements taken by the sensors 1004. This data can then be retransmitted from the NFC reader to Bluetooth relay 106 to the mobile phone 110 which can processed and displayed on the mobile phone 110 using the application 112, providing the user with real-time information about the conditions inside the tubeless tire.

This NFC Data Transmission method 1002 provides a comprehensive solution for wirelessly monitoring the pressure, sealant level, and temperature in tubeless tires. By integrating sensors 1004, NFC processor 118, NFC reader to Bluetooth relay 106, and a mobile phone 110 the system can measure the relevant parameters, process the sensor data, transmit the sensor data wirelessly, and display the sensor data to the user in real-time.

Figure 11:
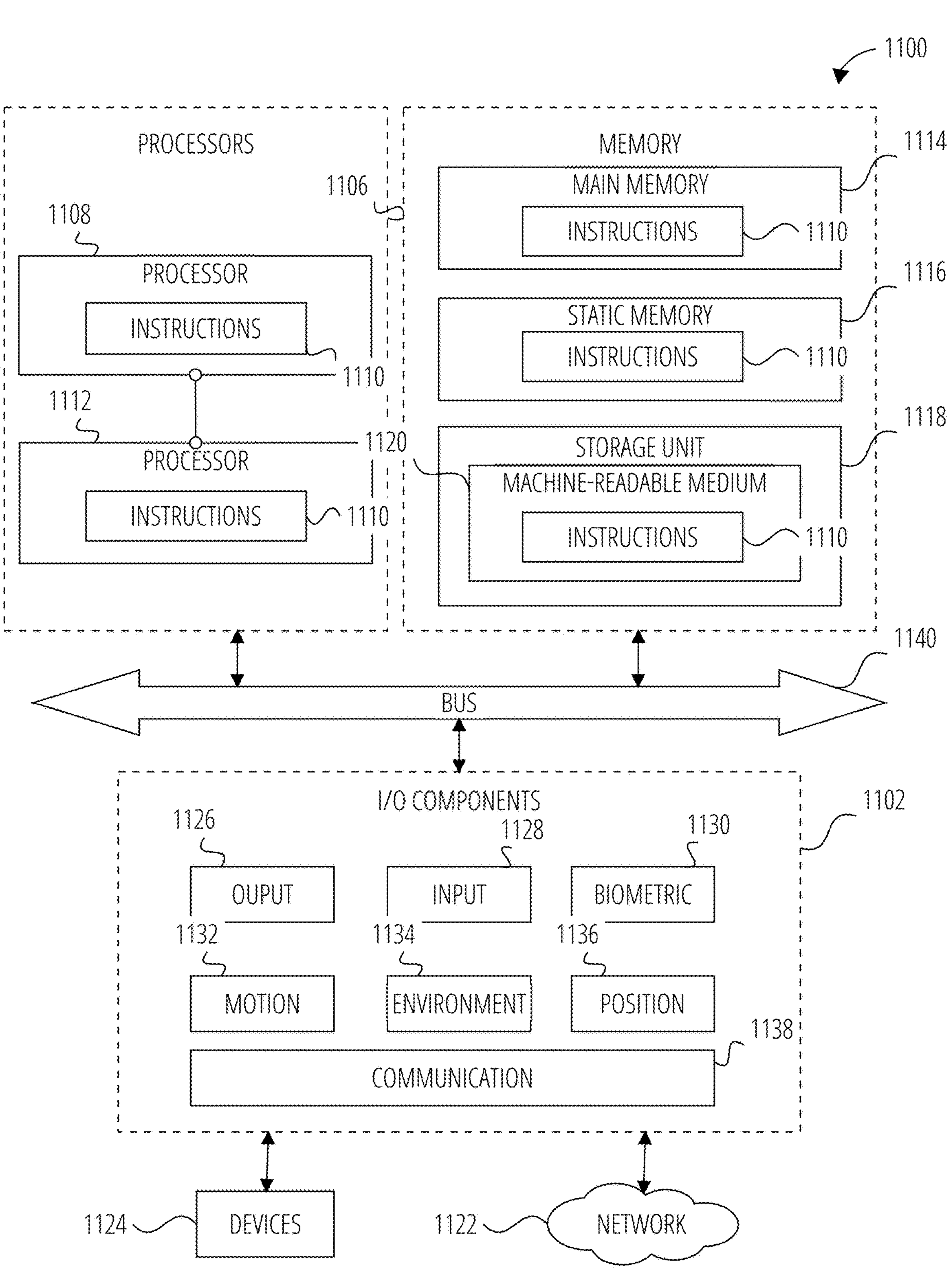
FIG. 11 is a diagrammatic representation illustrating a machine in the form of a computer system within which a set of instructions may be executed for causing the machine to perform any one or more of the methodologies discussed herein, according to some examples.

FIG. 11 is a diagrammatic representation of machine 1100 within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute the wireless tire monitoring methods described herein.

The instructions 1110 transform the general, non-programmed machine into a particular machine 1100 programmed to carry out the tire pressure and sealant monitoring functions in the manner described. The machine 1100 may operate as a standalone device or be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, the wireless sensor module 102, mobile phone 110 running application 112, or any machine capable of executing the instructions 1110 that specify actions to be taken. Further, while a single machine 1100 is illustrated, the term "machine" may include a collection of machines that individually or jointly execute the instructions 1110 to perform any one or more of the tire monitoring methodologies discussed herein.

The machine 1100 includes processors 1104, memory 1106, and I/O components 1102, which may be configured to communicate via a bus 1140. The processors 1104 may include specialized processors for tire monitoring such as the NFC processor 118 and pressure sensing chip, as well as general purpose processors like CPUs, GPUs, DSPs, ASICs, RFICs, TPUs, NPUs, VPUs, MLAs, FPGAs, and other processors.

The processors may execute instructions 1110 for monitoring tire pressure, sealant levels, temperature and humidity.

The memory 1106 includes main memory 1114, static memory 1116, and storage unit 1118, accessible to the processors 1104 via bus 1140. These memories may store the instructions 1110 embodying the tire monitoring methodologies described herein. The instructions may reside in any of these memories during execution.

The I/O components 1102 may for example include:

- Output components 1126: Displays for showing tire pressure and sealant data, speakers for alerts, haptic components for notifications
- Input components 1128: Touch screens and buttons for user interaction with the tire monitoring application
- Environmental components 1134: Pressure sensors, humidity sensors, and temperature sensors for monitoring tire conditions
- Communication components 1138: NFC components for wireless data transmission between the sensor module and mobile device, Bluetooth components for extended range communication The communication components 1138 enable may wireless transmission of tire sensor data using NFC and Bluetooth protocols. They handle the encoding and transmission of pressure, sealant level, temperature and humidity data from the wireless sensor module to the mobile application.

The various memories store instructions and data structures for implementing the tire monitoring system. These instructions, when executed by the processors, enable real-time monitoring of tire conditions and alert users when pressure or sealant levels are outside acceptable ranges.

The instructions 1110 may be transmitted between devices using NFC, Bluetooth or other protocols via the communication components 1138. This allows tire sensor data to be shared between the wireless sensor module and mobile application.

OTHER EXAMPLES

Wireless Sealant and Pressure Monitoring System for Tubeless Tires

Some examples of a wireless sealant and pressure monitoring system may be designed for use with tubeless tires. The system is particularly suited for monitoring the sealant level and air pressure within the tire, providing real-time data to ensure the tire's performance and safety.

Wireless Sensor Module

The wireless sensor module is designed to be embedded within the tubeless tire, a strategic placement that allows it to directly interact with the tire's internal environment. This positioning is integral to the module's ability to accurately measure the tire's pressure and sealant levels. Being embedded within the tire, the module is in close proximity to the tire's interior surface, enabling it to detect even minor changes in pressure.

Furthermore, the module is not just embedded within the tire, but it is also immersed in the sealant. The sealant, a liquid substance that is added inside the tubeless tire, plays a pivotal role in the tire's performance and safety. It helps to maintain the seal between the tire and the rim, and can also rapidly seal small punctures that occur while the tire is in use. By being immersed in the sealant, the module is in direct contact with the sealant, allowing it to accurately measure the sealant level. This direct contact with the sealant enables the module to detect the presence and amount of sealant based on its ability to conduct electrical current, providing a direct and reliable indication of the sealant level inside the tubeless tire.

The module comprises a processing chip, a pressure-sensing chip, two or more electrical contacts, and a wireless antenna. The processing chip is the central unit of the module, responsible for data acquisition, processing, and communication with the wireless reader device. The pressure sensing chip is in communication with the processing chip and is responsible for measuring the air pressure inside the tubeless tire. The pressure sensing chip can be based on various technologies, including piezoresistive elements, which provide accurate pressure readings within the operational range of the tire.

The two or more electrical contacts are also in communication with the processing chip and are used to detect the level of sealant within the tubeless tire. The processing chip is configured to measure the conductivity between these contacts, which varies with the amount of sealant present, providing an indication of the sealant level.

The wireless antenna facilitates communication between the sensor module and the wireless reader device. It is designed to operate at frequencies suitable for short-range wireless communication technologies such as NFC, Bluetooth, or Wi-Fi.

Wireless Communication Technologies

The wireless sensor module and wireless reader device can communicate using various wireless communication technologies. Near field communication (NFC) allows for close-range interactions and can also power the sensor module during data transactions. Bluetooth and Wi-Fi offer longer-range communication capabilities and are widely supported by modern mobile devices and computing platforms.

Power Management

The wireless sensor module is designed to operate without an internal power source, relying instead on energy received from the wireless reader device during NFC transactions or other energy-harvesting methods. This design choice minimizes maintenance and allows the module to enter a low power state when not actively communicating, thereby extending its operational lifespan.

Installation and Encapsulation

The wireless sensor module is adhered to an inside surface of the tubeless tire, which can be marked on the outside surface for accurate placement. The module is partially encapsulated by the sealant, except for the electrical contacts, to protect it from moisture and corrosion. A potting compound may be used to further protect the module's components, ensuring durability and reliability.

Additional Sensors and Data Transmission

In addition to pressure and sealant level measurements, the wireless sensor module may include additional sensors, such as temperature and humidity sensors, to provide a comprehensive overview of the tire's condition. The module is configured to relay this data to the wireless reader device using an NFC data exchange format or other suitable communication protocols.

Specific Components and Configurations

The wireless sensor module may incorporate specific components such as an NFC processing chip and a pressure sensing chip, such as the STMicroelectronics ILPS22QS chip. The NFC antenna can be integrated onto the module's printed circuit board or connected as a flexible antenna, depending on the design requirements.

The module's ability to detect changes in conductivity as the sealant level varies is a pivotal feature. An increase in conductivity indicates a higher level of sealant, while a decrease suggests a lower level. This dynamic monitoring capability is integral to maintaining the tire's performance and safety.

Mounting and Weight Considerations

The design of the wireless sensor module takes into account its physical dimensions and weight to ensure that it does not negatively impact the balance or performance of the tire. The size and weight of the module are carefully optimized to fit within the limited space available inside the tire. This is a particularly challenging aspect of the design process, as the module has to be small and lightweight enough to fit within the tire without causing any imbalance or performance issues.

The diameter of the module is one of the primary considerations in its design. It has to be small enough to fit within the tire, but large enough to house all the components of the module, including the sensors, processing chip, and wireless transmitter. The diameter of the module is therefore optimized to provide a balance between size and functionality.

The thickness of the module is another major consideration. A thinner module can fit more easily within the tire and is less likely to cause any imbalance or performance issues. However, the module also has to be thick enough to protect the components from the harsh conditions inside the tire, including pressure, temperature, and moisture. The thickness of the module is therefore optimized to provide a balance between protection and performance.

The weight of the module is also a factor in its design. A heavier module could cause an imbalance in the tire, leading to performance issues. However, the module also has to be heavy enough to stay in place within the tire, especially during high-speed or off-road driving. The weight of the module is therefore optimized to provide a balance between stability and performance.

In summary, the design of the wireless sensor module involves careful consideration of its physical dimensions and weight. The module's diameter, thickness, and weight are all optimized to ensure that it fits within the tire's limited space without adversely affecting the tire's balance or performance.

Overall, the wireless sealant and pressure monitoring system provides a robust solution for real-time monitoring of tubeless tires, enhancing the safety and efficiency of vehicles equipped with such tires.

Technical Solutions to Technical Problems

Inaccurate Sealant Level Monitoring

One of the technical challenges that the disclosed system addresses is the inherent difficulty in accurately monitoring the level of sealant within tubeless tires. Traditional pressure sensors, which are primarily designed to measure air pressure, are not equipped to measure the presence of a liquid sealant. This is due to the fact that the physical properties of a liquid sealant are vastly different from those of air. As a result, when these traditional sensors come into contact with the sealant, they can produce inaccurate readings. Furthermore, the sealant can potentially cause damage to the sensors, leading to sensor failure and further inaccuracies in the readings.

However, the disclosed system provides a solution to this problem by incorporating an integrated wireless component with conductive sealant sensor pads and a current sensor (130). This innovative design allows for a direct indication of the sealant level by measuring the electrical current flowing between the sensor pads. The principle behind this method is that the sealant, being a conductive liquid, allows for the flow of electrical current. As such, the level of sealant within the tire can be inferred from the amount of current flowing between the sensor pads. This method of sealant level detection allows for accurate monitoring, which is pivotal for the tire's performance and safety. By accurately monitoring the sealant level, the system can alert the user when the sealant level falls below a threshold, thereby enabling timely replenishment of the sealant and ensuring the continued performance and safety of the tire.

Sealant Distribution Variability

Another technical challenge that arises in the context of tubeless tires is the variability in the distribution of the sealant within the tire. The sealant, which is a liquid substance, is free to move around inside the tire. This mobility of the sealant can lead to uneven distribution, with some areas of the tire having more sealant than others. This variability in sealant distribution can affect the tire's ability to self-seal punctures effectively. In particular, areas of the tire with less sealant may be more prone to punctures, as there is not enough sealant to seal the puncture quickly and effectively. This can compromise the performance and safety of the tire, leading to a higher risk of tire failure and potential accidents.

To address this issue, the disclosed system incorporates a sealant monitoring system that can indicate variable sealant distribution within the tire. This system, as depicted in FIG. 3, measures the conductivity at different locations within the tire. The principle behind this method is that the sealant, being a conductive liquid, allows for the flow of electrical current. Therefore, by measuring the conductivity at different locations, the system can infer the distribution of the sealant within the tire.

When the sealant is evenly distributed throughout the tire, the conductivity at different locations will be approximately the same. However, if the sealant is unevenly distributed, the conductivity will vary between different locations. By monitoring these variations in conductivity, the system can detect areas of the tire with less sealant and alert the user to replenish the sealant in these areas. This ensures that the sealant is evenly distributed throughout the tire, enhancing the tire's ability to self-seal punctures and improving the overall performance and safety of the tire.

Environmental Damage to Sensors

Tubeless tires, by their nature, are exposed to a variety of environmental conditions that can be detrimental to the functionality and lifespan of the sensors embedded within them. These conditions include moisture and corrosion, which can cause damage to the sensors and impair their ability to accurately measure tire pressure and sealant levels. Moisture can seep into the sensors and interfere with their electrical components, leading to inaccurate readings or even complete sensor failure. Similarly, corrosion can degrade the sensors over time, reducing their effectiveness and reliability.

Given these challenges, it is imperative to protect the sensors from these harsh environmental conditions to ensure their continued functionality and longevity. The disclosed wireless sensor module (102) addresses this issue by incorporating a protective encapsulation. This encapsulation is provided by a PCB potting sealant (108), as depicted in FIG. 1. The PCB potting sealant (108) forms a protective barrier around the wireless sensor module (100), shielding it from moisture and corrosion.

The PCB potting sealant (108) is a special type of sealant that is designed to withstand the harsh conditions inside a tubeless tire. It is resistant to moisture and corrosion, ensuring that it can effectively protect the wireless sensor module (100) from these damaging factors. The PCB potting sealant (108) is applied to encapsulate the wireless sensor module (100), covering all its components except for the two or more electrical contacts (126) that are used to measure the sealant level. These electrical contacts (126) are left exposed to the interior of the tubeless tire to enable them to come into contact with the sealant and measure its level.

By encapsulating the wireless sensor module (102) with the PCB potting sealant (108), the system enhances the durability and reliability of the monitoring system. This protective encapsulation ensures that the sensors can continue to accurately measure the tire pressure and sealant level, even in the face of harsh environmental conditions. This, in turn, enhances the safety and efficiency of vehicles equipped with tubeless tires, as it allows for accurate and reliable monitoring of tire pressure and sealant levels.

Energy Consumption and Power Supply

Wireless sensor modules, such as those used in the disclosed system for monitoring tire pressure and sealant levels, typically require a power source to function. This power is used to operate the sensors, process the sensor data, and transmit the data wirelessly to an external device. However, managing the energy consumption of these sensor modules can be a challenging task, particularly in the context of a tire environment.

Tires, especially tubeless tires, present a harsh and demanding environment for electronic devices. They are exposed to a wide range of temperatures, pressures, and mechanical stresses, which can affect the performance and lifespan of the sensor modules. Moreover, the interior of a tire is a confined space with limited access, making it impractical to replace batteries or other power sources. This poses a challenge for the design and operation of wireless sensor modules, as they have to be self-sufficient in terms of power.

The solution to this challenge, as implemented in the disclosed system, involves the use of an NFC processor (116) connected to an NFC antenna (118). This setup allows the sensor module to harvest energy passively from NFC transactions. NFC, or Near Field Communication, is a wireless communication technology that allows for short-range communication between devices. During an NFC transaction, a small amount of energy is transferred from the NFC reader device to the NFC tag or sensor module. This energy can be harvested and used to power the sensor module.

By using this passive energy harvesting approach, the system can reduce the power requirements of the sensor module, thereby extending its operational lifespan and eliminating the dependency on an internal power source. This not only solves the problem of energy management in a tire environment but also enhances the reliability and convenience of the system. With this solution, the sensor module can continue to monitor the tire pressure and sealant levels accurately and reliably, even in the challenging environment of a tubeless tire.

Real-Time Data Transmission

Transmitting real-time data from the sensors to an external device for monitoring can be challenging due to the limitations of wireless communication within the metal-rich environment of a tire and rim assembly. The metal components of the tire and rim can interfere with the wireless signals, causing signal loss or degradation. This can result in incomplete or inaccurate data transmission, which can compromise the effectiveness of the monitoring system.

Moreover, the confined space inside the tire can further exacerbate these challenges. The limited space can restrict the propagation of the wireless signals, making it difficult for the signals to reach the external device. This can lead to intermittent or unreliable data transmission, which can hinder real-time monitoring of the tire pressure and sealant levels.

To overcome these challenges, the wireless transmitter (150) is configured to communicate with external devices such as a mobile phone (110) using NFC or Bluetooth technology, as outlined in FIG. 9. Both NFC and Bluetooth technologies are designed to provide robust and reliable wireless communication even in challenging environments. They use advanced signal processing techniques to mitigate the effects of signal interference and loss, ensuring efficient and reliable data transmission.

NFC, or Near Field Communication, is particularly well-suited for short-range communication. It operates at a frequency that is less affected by the metal components of the tire and rim, allowing for efficient data transmission within the confined space of the tire. Bluetooth, on the other hand, is designed for longer-range communication. It uses a frequency hopping spread spectrum to avoid interference, ensuring reliable data transmission even over longer distances.

By leveraging these wireless communication technologies, the system can transmit real-time data from the sensors to the external device efficiently and reliably. This allows for real-time monitoring of the tire pressure and sealant levels, enhancing the safety and efficiency of vehicles equipped with tubeless tires.

Sensor Data Integration and Display

Integrating various sensor data streams and presenting them in a user-friendly manner on an external device can be a complex task. This complexity arises from the diverse nature of the sensor data, which includes measurements of pressure, sealant level, humidity, and temperature. Each of these measurements is captured by a different sensor and may be represented in a different format or unit of measurement. Furthermore, the sensor data is dynamic, changing over time as the conditions inside the tire change. This dynamic nature of the sensor data adds another layer of complexity to the task of integration and presentation.

The NFC processor (118) plays a pivotal role in addressing this challenge. It serves as the central processing unit for the sensor data, receiving inputs from the pressure sensor (1144), sealant sensor (116), humidity sensor (122), and temperature sensor (124). The NFC processor (116) is designed to handle the diverse and dynamic nature of the sensor data. It processes the sensor data, converting it into a standardized format that can be easily transmitted and interpreted. This standardized format ensures that the sensor data is consistent and uniform, regardless of the specific sensor that generated it.

Once the sensor data has been processed and standardized, it is prepared for wireless transmission. This involves encoding the sensor data into a format that can be transmitted wirelessly, such as NFC or Bluetooth. The NFC processor (118) handles this encoding process, ensuring that the sensor data is packaged correctly for wireless transmission.

The final step in the process involves presenting the sensor data on an external device. This is achieved through a mobile application (112), which receives the wirelessly transmitted sensor data and displays it in an intuitive format for the user. The mobile application (112) is designed to present the sensor data in a user-friendly manner, making it easy for the user to understand and interpret the data. This includes visual representations of the sensor data, such as graphs or charts, as well as alerts or notifications if the sensor data indicates a potential issue with the tire. By integrating and presenting the sensor data in this manner, the system provides the user with a comprehensive and real-time overview of the conditions inside the tubeless tire.

Sensor Installation and Positioning

Ensuring the correct installation and positioning of the sensor module within the tubeless tire is a factor for obtaining accurate measurements. However, achieving this can be a complex task due to the lack of a clear reference point within the tire's interior. The sensor module, being small and lightweight, can easily shift or rotate within the tire, leading to inaccurate readings of the sealant level and tire pressure. This can compromise the effectiveness of the monitoring system and lead to potential safety issues.

To address this challenge, an approach has been adopted in the design of the sensor module (100). The sensor module is adhered to the inside surface of the tubeless tire at a location that corresponds to an existing marking on the outside surface of the tire. This marking can be a manufacturer's logo, a specification label, or any other marking that is already present on the outside surface of the tire. By aligning the sensor module with this external marking, it can be accurately positioned within the tire, ensuring that it remains in the correct location for effective monitoring.

This innovative solution not only simplifies the installation process but also enhances the accuracy of the sensor module. By adhering the sensor module to a specific location within the tire, it is ensured that the sensor module remains stationary, even during tire rotation. This stationary positioning allows the sensor module to accurately measure the sealant level and tire pressure, enhancing the reliability and effectiveness of the monitoring system. Furthermore, this solution eliminates the guesswork involved in sensor module placement, making the installation process more straightforward and user-friendly.

Dynamic Sealant Level Measurement

The inherent fluidity of the sealant used in tubeless tires presents a distinct challenge when it comes to accurately measuring its level. As the tire is in operation, the sealant moves freely within the tire's interior. This movement can cause fluctuations in the sealant level at any given point within the tire, making it difficult to obtain a precise measurement. Traditional methods of level measurement, which are typically designed for static or slow-moving liquids, may not provide accurate results in this dynamic environment.

To overcome this challenge, the system incorporates a novel approach to sealant level measurement that takes into account the fluid nature of the sealant. Specifically, the system is configured to detect the level of sealant by rotating the tubeless tire. This rotation causes the sealant to move over the sensor pads of the sealant sensor, changing the conductivity reading and providing a dynamic measure of the sealant level.

This method of sealant level detection leverages the fluidity of the sealant to provide a more accurate and representative measurement. As the tire rotates, the sealant flows over the sensor pads, creating a change in conductivity that directly corresponds to the sealant level at that particular point in the tire. By continuously monitoring this conductivity change as the tire rotates, the system can map the distribution of the sealant within the tire and accurately determine its overall level.

This dynamic measurement approach not only enhances the accuracy of the sealant level detection but also provides real-time data on the sealant distribution within the tire. This information can be invaluable for maintaining the performance and safety of the tire, as it allows the user to ensure that the sealant is evenly distributed throughout the tire and to replenish the sealant if it falls below the recommended level in any segment of the tire.

EXAMPLES

Example 1 is a wireless sealant and pressure monitoring system for tubeless tires, the system comprising: a wireless sensor module configured to be embedded within a tubeless tire and immersed in a sealant, the wireless sensor module comprising: a processing chip; a pressure sensing chip in communication with the processing chip; two or more electrical contacts in communication with the processing chip, wherein the processing chip is configured to detect a level of sealant in the tubeless tire based on conductivity between the two or more electrical contacts; and a wireless antenna in communication with the processing chip; a wireless reader device configured to wirelessly communicate with the wireless sensor module.

In Example 2, the subject matter of Example 1 includes, wherein the wireless sensor module and the wireless reader device communicate using near field communication (NFC).

In Example 3, the subject matter of Example 2 includes, wherein the wireless sensor module is powered by energy received from the wireless reader device during an NFC transaction between the wireless sensor module and the wireless reader device.

In Example 4, the subject matter of Examples 1-3 includes, wherein the wireless sensor module and the wireless reader device communicate using Bluetooth.

In Example 5, the subject matter of Examples 1-4 includes, wherein the wireless sensor module and the wireless reader device communicate using Wi-Fi.

In Example 6, the subject matter of Examples 1-5 includes, wherein the processing chip is configured to detect the level of the sealant by pulsing a current between the two or more electrical contacts to measure the conductivity between the two or more electrical contacts.

In Example 7, the subject matter of Examples 1-6 includes, wherein the wireless sensor module does not comprise an internal power source.

In Example 8, the subject matter of Examples 1-7 includes, wherein the wireless sensor module is adhered to an inside surface of the tubeless tire.

In Example 9, the subject matter of Examples 1-8 includes, wherein the wireless sensor module is at least partially encapsulated by the sealant within the tubeless tire except for the two or more electrical contacts.

In Example 10, the subject matter of Examples 1-9 includes, wherein the sealant comprises a puncture sealant configured to seal punctures within the tubeless tire.

In Example 11, the subject matter of Examples 1-10 includes, wherein the wireless reader device is mounted to a bicycle frame.

In Example 12, the subject matter of Examples 1-11 includes, wherein the wireless sensor module is configured to enter a low power state when not communicating with the wireless reader device.

In Example 13, the subject matter of Examples 1-12 wherein the two or more electrical contacts of the wireless sensor module are spaced between 0.25 inches and 0.5 inches apart.

In Example 14, the subject matter of Examples 1-13 wherein the wireless sensor module has a diameter of less than 2 inches.

In Example 15, the subject matter of Examples 1-14 wherein the wireless sensor module has a thickness of less than 0.5 inches.

In Example 16, the subject matter of Examples 1-15 wherein the wireless sensor module weighs less than 50 grams.

In Example 17, the subject matter of Examples 1-16 includes, wherein the processing chip is further configured to detect a temperature within the tubeless tire, and wherein the wireless sensor module is further configured to relay temperature data to the wireless reader device.

In Example 18, the subject matter of Examples 1-17 includes, wherein the wireless sensor module further comprises a humidity sensor in communication with the processing chip, and wherein the processing chip is further configured to detect a humidity level within the tubeless tire based on input from the humidity sensor.

In Example 19, the subject matter of Example 18 includes, wherein the wireless sensor module is further configured to relay humidity level data to the wireless reader device.

In Example 20, the subject matter of Examples 1-19 includes, wherein the wireless sensor module is adhered to an inside surface of the tubeless tire at a location marked on an outside surface of the tubeless tire.

In Example 21, the subject matter of Examples 1-20 includes, wherein the wireless sensor module is adhered to an inside surface of the tubeless tire at a location corresponding to an existing marking on an outside surface of the tubeless tire.

In Example 22, the subject matter of Examples 1-21 includes, wherein the wireless sensor module is at least partially encapsulated within a potting compound configured to protect the wireless sensor module from moisture and corrosion.

In Example 23, the subject matter of Example 22 includes, wherein the potting compound encapsulates the wireless sensor module except for the two or more electrical contacts.

In Example 24, the subject matter of Examples 1-23 includes, wherein the wireless sensor module is configured to relay tire pressure data, sealant level data, and temperature data to the wireless reader device using an NFC data exchange format.

In Example 25, the subject matter of Examples 1-24 includes, wherein the wireless sensor module comprises an NFC processing chip.

In Example 26, the subject matter of Examples 1-25 includes, QS chip.

In Example 27, the subject matter of Examples 1-26 includes, wherein the wireless sensor module comprises an NFC antenna integrated onto a printed circuit board of the wireless sensor module.

In Example 28, the subject matter of Examples 1-27 includes, wherein the wireless sensor module comprises a flexible NFC antenna connected to a printed circuit board of the wireless sensor module.

In Example 29, the subject matter of Examples 1-28 includes, wherein the wireless sensor module is configured to detect an increased conductivity between the two or more electrical contacts as the level of sealant increases.

In Example 30, the subject matter of Examples 1-29 includes, wherein the wireless sensor module is configured to detect a decreased conductivity between the two or more electrical contacts as the level of sealant decreases.

Example 31 is a wireless sealant monitoring system for tubeless tires comprising: an integrated wireless component positioned inside a tubeless tire, the integrated wireless component further comprising: a first conductive sealant sensor pad; a second conductive sealant sensor pad, wherein the first and second sealant sensor pads are exposed to an interior of the tubeless tire; a current sensor electrically connected to the first and second sealant sensor pads, the current sensor configured to measure an electrical current flowing between the first and second sealant sensor pads; and a wireless transmitter in communication with the current sensor, the wireless transmitter configured to transmit data corresponding to the measured electrical current.

In Example 32, the subject matter of Example 31 includes, wherein the integrated wireless component is further comprised of a flexible substrate, and wherein the first conductive sealant sensor pad, the second conductive sealant sensor pad, the current sensor, and the wireless transmitter are attached to the flexible substrate.

In Example 33, the subject matter of Example 32 includes, wherein the flexible substrate enables the integrated wireless component to conform to an interior surface of the tubeless tire.

In Example 34, the subject matter of Examples 31-33 includes, wherein the wireless transmitter is a near field communication (NFC) transmitter.

In Example 35, the subject matter of Examples 31-34 includes, inch apart.

Example 36 is a method for monitoring a sealant level in a tubeless tire, the method comprising: positioning an integrated wireless component inside the tubeless tire, the integrated wireless component comprising first and second conductive sealant sensor pads exposed to an interior of the tubeless tire; measuring, using a current sensor electrically connected to the first and second sealant sensor pads, an electrical current flowing between the first and second sealant sensor pads; and transmitting, by a wireless transmitter, data corresponding to the measured electrical current.

Example 37 is a wireless sealant and pressure monitoring system for tubeless tires comprising: an integrated wireless component positioned inside a tubeless tire, the integrated wireless component further comprising: a first conductive sealant sensor pad; a second conductive sealant sensor pad, wherein the first and second sealant sensor pads are exposed to an interior of the tubeless tire; a current sensor electrically connected to the first and second sealant sensor pads, the current sensor configured to measure an electrical current flowing between the first and second sealant sensor pads; a pressure sensor for measuring a pressure inside the tubeless tire; a wireless transmitter in communication with the current sensor and pressure sensor, the wireless transmitter configured to transmit data corresponding to the measured electrical current and measured pressure.

In Example 38, the subject matter of Example 37 includes, wherein the pressure sensor is a piezoresistive pressure sensor.

In Example 39, the subject matter of Example 38 wherein the piezoresistive pressure sensor is configured to measure pressures in a range of 5 to 60 PSI In Example 40, the subject matter of Examples 37-39 includes, wherein the pressure sensor is in communication with the current sensor.

In Example 41, the subject matter of Example 40 includes, wherein the current sensor provides power to the pressure sensor.

In Example 42, the subject matter of Examples 37-41 includes, a sealant level alert system and a tire pressure alert system in communication with the wireless transmitter.

In Example 43, the subject matter of Example 42 includes, wherein: the sealant level alert system determines a sealant level based on the data transmitted by the wireless transmitter corresponding to the measured electrical current; and the tire pressure alert system determines a tire pressure based on the data transmitted by the wireless transmitter corresponding to the measured pressure.

In Example 44, the subject matter of Example 43 includes, wherein: the sealant level alert system provides an alert if the determined sealant level is below a threshold level; and the tire pressure alert system provides an alert if the determined tire pressure is above or below threshold pressure levels.

Example 45 is a method for monitoring a sealant level in a tubeless tire, the method comprising: measuring a pressure inside the tubeless tire using a pressure sensor; transmitting, by a wireless transmitter, data corresponding to the measured pressure; determining, by a tire pressure alert system, a tire pressure based on the transmitted data corresponding to the measured pressure; and providing, by the tire pressure alert system, an alert if the determined tire pressure is above or below threshold pressure levels.

Example 46 is a wireless sealant and pressure monitoring system for tubeless tires comprising: an integrated wireless component positioned inside a tubeless tire, the integrated wireless component further comprising: a first conductive sealant sensor pad; a second conductive sealant sensor pad, wherein the first and second sealant sensor pads are exposed to an interior of the tubeless tire; a current sensor electrically connected to the first and second sealant sensor pads, the current sensor configured to measure an electrical current flowing between the first and second sealant sensor pads; a pressure sensor for measuring a pressure inside the tubeless tire; a wireless transmitter in communication with the current sensor and pressure sensor, the wireless transmitter configured to transmit data corresponding to the measured electrical current and measured pressure.

In Example 47, the subject matter of Example 46 includes, wherein the pressure sensor is a piezoresistive pressure sensor.

In Example 48, the subject matter of Example 47 wherein the piezoresistive pressure sensor is configured to measure pressures in a range of 5 to 60 PSI In Example 49, the subject matter of Examples 46-48 includes, wherein the pressure sensor is in communication with the current sensor.

In Example 50, the subject matter of Example 49 includes, wherein the current sensor provides power to the pressure sensor.

In Example 51, the subject matter of Examples 46-50 includes, a sealant level alert system and a tire pressure alert system in communication with the wireless transmitter.

In Example 52, the subject matter of Example 51 includes, wherein: the sealant level alert system determines a sealant level based on the data transmitted by the wireless transmitter corresponding to the measured electrical current; and the tire pressure alert system determines a tire pressure based on the data transmitted by the wireless transmitter corresponding to the measured pressure.

In Example 53, the subject matter of Example 52 includes, wherein: the sealant level alert system provides a first alert based on the determined sealant level being below a threshold level; and the tire pressure alert system provides a second alert based on the determined tire pressure being above or below threshold pressure levels.

Example 54 is a wireless sealant and pressure monitoring module for tubeless tires, comprising: a sealant sensor configured to measure sealant levels inside a tubeless tire; a pressure sensor configured to measure air pressure inside the tubeless tire; a wireless transmitter in communication with the sealant sensor and the pressure sensor, the wireless transmitter configured to transmit wireless signals corresponding to the measured sealant levels and tire pressure; a flexible substrate, wherein the sealant sensor, the pressure sensor, and the wireless transmitter are attached to the flexible substrate; an adhesive coating disposed on the flexible substrate for attaching the wireless sealant and pressure monitoring module to an interior surface of the tubeless tire; and a first and second conductive sealant sensor pad electrically connected to the sealant sensor, wherein the flexible substrate conforms to the interior surface of the tubeless tire such that the first and second conductive sealant sensor pads are exposed to sealant inside the tire.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

What is claimed is:

1. A wireless monitoring system for tubeless tires, comprising:
- a sensor module configured to be positioned within a tubeless tire, comprising:
- sealant detection elements configured to detect a sealant level and generate sealant level data;
- a pressure sensor configured to measure internal tire pressure and generate pressure data; and
- a wireless transmitter configured to transmit the sealant level data and the pressure data,
- wherein the sealant detection elements are configured to measure electrical conductivity within the tubeless tire to detect the sealant level, and
- wherein the sensor module is configured to:
  - detect changes in conductivity during tire rotation;
  - correlate the changes in conductivity with sequential positions during incremental rotation of the tubeless tire to generate a sealant distribution profile; and
  - determine a sealant level based on a rate of change of conductivity across the sealant distribution profile.

2. The wireless monitoring system of claim 1, wherein the sealant detection elements comprise:
- first and second conductive sensor pads spaced between 0.25 and 0.5 inches apart; and
- a current sensor electrically connected to the first and second conductive sensor pads, wherein the current sensor is configured to measure a pulsed electrical current flow between the first and second conductive sensor pads.

3. The wireless monitoring system of claim 1, further comprising:
- a flexible substrate supporting the sensor module; and
- an adhesive layer on the flexible substrate configured to secure the sensor module to an interior surface of the tubeless tire,
- wherein the flexible substrate enables the sensor module to conform to the interior surface.

4. The wireless monitoring system of claim 1, further comprising:
- a potting compound partially encapsulating the sensor module, such that the sealant detection elements remain operationally exposed to an interior of the tubeless tire when the sensor module is positioned within the tubeless tire.

5. The wireless monitoring system of claim 1, wherein the wireless transmitter comprises:
- an NFC processor; and
- an NFC antenna,
- the sensor module being configured to harvest energy from NFC communications for powering the sensor module.

6. The wireless monitoring system of claim 1, further comprising:
- a humidity sensor configured to measure humidity within the tubeless tire and to generate humidity data; and
- a temperature sensor configured to measure temperature within the tubeless tire and to generate temperature data,
- the wireless transmitter being configured to transmit the humidity data and the temperature data.

7. The wireless monitoring system of claim 1, further comprising a processing chip configured to:
- encode sensor data into NDEF records;
- combine the NDEF records into message packets; and
- control transmission of the message packets.

8. The wireless monitoring system of claim 1, further comprising an NFC reader to Bluetooth relay module configured to:
- receive NFC transmissions from the sensor module;
- convert the NFC transmissions to Bluetooth signals; and
- relay the Bluetooth signals to a mobile device.

9. The wireless monitoring system of claim 1, further comprising a sealant level alert system configured to:
- compare detected sealant levels to threshold values;
- generate alerts when sealant levels fall below thresholds; and
- transmit the alerts via the wireless transmitter.

10. The wireless monitoring system of claim 1, further comprising a tire pressure alert system configured to:
- compare measured pressure to predetermined thresholds;
- generate an alert based on the measured pressure transgresses a threshold; and
- transmit the alert via the wireless transmitter.

11. The wireless monitoring system of claim 1, wherein the sensor module is configured to:
- enter a low power state between measurement cycles;

wake upon receiving wireless communication signals; and resume measurements upon waking.

12. The wireless monitoring system of claim 1, wherein the sensor module is positioned at a location corresponding to an external tire marking, such that the sealant detection elements contact sealant during tire rotation.

13. A method for monitoring a tubeless tire, comprising:

detecting a sealant level, within the tubeless tire by measuring electrical conductivity, and generating detected sealant level data based on the measured electrical conductivity, the detecting of the sealant level comprising:

applying a periodic voltage between conductive sensor pads;

measuring a pulsed current flow between the conductive sensor pads;

determining sealant presence based on the measured pulsed current flow; and mapping sealant distribution during tire rotation;

measuring internal tire pressure to generate measured pressure data;

wirelessly transmitting the detected sealant level data and the measured pressure data as transmitted data; and processing the transmitted data to monitor tire conditions.

14. The method of claim 13, further comprising:

harvesting energy from wireless communications;

powering sensing operations with harvested energy;

entering low power states between measurements; and awakening upon receiving wireless signals.

15. The method of claim 13, further comprising:

measuring humidity within the tubeless tire to generate humidity data;

measuring temperature within the tubeless tire to generate temperature data;

using the humidity data to verify the detected sealant level data; and transmitting the humidity data and the temperature data with the detected sealant level data and the measured pressure data.

16. The method of claim 13, further comprising:

comparing the detected sealant level to a sealant threshold value;

comparing a measured pressure data to a pressure threshold value;

generating an alert based on at least one of the sealant threshold value or the pressure threshold value being transgressed; and wirelessly transmitting the generated alert.

* * * * *